United States Patent
Liao et al.

(10) Patent No.: US 11,911,963 B2
(45) Date of Patent: Feb. 27, 2024

(54) EXCHANGEABLE ADDITIVE MANUFACTURING MACHINE SYSTEM WITH CAPILLARY BASED FUNCTIONAL LIQUID RELEASING MODULE

(71) Applicant: National Central University, Taoyuan (TW)

(72) Inventors: Chao-Yaug Liao, Taoyuan (TW); Bo-Ren Chen, Taoyuan (TW)

(73) Assignee: National Central University, Taoyuan (TW)

( * ) Notice: Subject to any disclaimer, the term of this patent is extended or adjusted under 35 U.S.C. 154(b) by 0 days.

(21) Appl. No.: 17/969,290

(22) Filed: Oct. 19, 2022

(65) Prior Publication Data
US 2023/0415413 A1 Dec. 28, 2023

(30) Foreign Application Priority Data
Jun. 23, 2022 (TW) .................................. 111123513

(51) Int. Cl.
*B29C 64/20* (2017.01)
*B29C 64/25* (2017.01)
*B29C 64/295* (2017.01)
*B29C 64/245* (2017.01)
*B33Y 30/00* (2015.01)
*B29C 64/209* (2017.01)
*B29C 64/232* (2017.01)
*B29C 64/236* (2017.01)
*B29C 64/255* (2017.01)

(52) U.S. Cl.
CPC ............ *B29C 64/25* (2017.08); *B29C 64/209* (2017.08); *B29C 64/232* (2017.08); *B29C 64/236* (2017.08); *B29C 64/245* (2017.08); *B29C 64/255* (2017.08); *B29C 64/295* (2017.08); *B33Y 30/00* (2014.12)

(58) Field of Classification Search
CPC ..... B29C 64/25; B29C 64/232; B29C 64/245; B29C 64/255; B29C 64/209; B29C 64/295; B29C 64/236; B33Y 00/00
See application file for complete search history.

(56) References Cited

U.S. PATENT DOCUMENTS

2018/0200790 A1* 7/2018 Hart ........................ B22F 10/28
2018/0326660 A1* 11/2018 Gifford ................ B29C 64/245
2020/0324484 A1* 10/2020 Simpson ............... B29C 64/393

* cited by examiner

*Primary Examiner* — Alison L Hindenlang
*Assistant Examiner* — Keran V Nguyen
(74) *Attorney, Agent, or Firm* — Jackson IPG PLLC; Demian K. Jackson

(57) ABSTRACT

The present invention relates to an exchangeable additive manufacturing machine system. The system includes a manufacturing spindle; a thermal conducting module configured to include a working well in a center portion, wherein the manufacturing spindle is configured to rotate in the working well and the manufacturing spindle and the working well defines a manufacturing region; and a capillary based functional liquid releasing module configured on the thermal conducting module to release a functional liquid to one of a first gap, a second gap and a third gap included between the thermal conducting module and the manufacturing platform.

8 Claims, 15 Drawing Sheets

EXCHANGEABLE ADDITIVE MANUFACTURING MACHINE SYSTEM WITH CAPILLARY BASED FUNCTIONAL LIQUID RELEASING MODULE

CROSS-REFERENCE TO RELATED APPLICATION

This application claims priority benefit to Taiwan Invention Patent Application Serial No. 111123513, filed on Jun. 23, 2022, in Taiwan Intellectual Property Office, the entire disclosures of which are incorporated by reference herein.

FIELD

The present invention relates to an exchangeable additive manufacturing machine system, in particular to an exchangeable additive manufacturing machine system having a specially designed capillary based functional liquid releasing module to release a functional liquid into a micro assembly slot or any micro gap in the exchangeable additive manufacturing machine.

BACKGROUND

In the state of the art of bioprinting technology, in order to cope with some special bioprinting materials that have different characteristics, it is used to perform a bioprinting operation in a relatively low-temperature environment. For example, an operating temperature for a bioprinter machine is better to be controlled and maintained in a temperature range of from −20° C. to −40° C., which renders the deposited materials being capable of quickly and instantly solidifying to facilitate the successively multilayered stacking process for materials. For different operating temperatures required by different bioprinting materials, bioprinting often needs to be implemented at temperatures between −40° C. and +37° C., and it is necessary to constantly switch and control the operating temperature.

However, when a conventional bioprinter performs a low-temperature printing, the assembly seams of the machine itself, or the gaps between the movable parts and the base, often suffer from frosting problems due to the infiltration of moisture in the air. Therefore, during the printing process, it leads to various abnormal situations, such as collisions, jitters, needle jams, and even shutdown.

It seriously affects the printing quality and speed, and also causes a certain degree of damages to the machine. When printing at room temperature, the assembly seams and gaps on the machine are also filled with air, resulting in poor heat transfer efficiency.

The traditional solution is that manually drip antifreeze into the assembly seams or gaps to dissolve frost and eliminate abnormal conditions, or inject heat transfer fluid into the gaps manually to improve heat transfer efficiency. However, various manual operations not only need to suspend printing, which prolongs the printing time, but also may lead to contamination of semi-finished products during printing due to manual intervention.

Hence, there is a need to solve the above deficiencies/issues.

SUMMARY

The present invention relates to an exchangeable additive manufacturing machine system, in particular to an exchangeable additive manufacturing machine system having a specially designed capillary based functional liquid releasing module to release a functional liquid into a micro assembly slot or any micro gap in the exchangeable additive manufacturing machine.

The present invention develops a module that utilizes capillary action to release a functional liquid such as an antifreeze or a heat transfer liquid, which the module is able to integrate into a three-dimensional additive manufacturing machine and a rotary additive manufacturing machine included in an exchangeable additive manufacturing machine system, and does not affect the original function of the exchangeable additive manufacturing machine system. During low temperature operation, it releases, for example but not limited to, an antifreeze to a tiny gap or an assembly seam of the machine. In addition to removing frost, it can also replace the air contained in the gap. Because the air is a good thermal insulation medium, the addition of an antifreeze improves the efficiency of energy transfer. During room temperature operation, it releases, for example but not limited to, a lubricating liquid to a tiny gap or an assembly seam of the machine. In addition to effectively reducing frictional resistance, it can also replace the air contained in the gap and improve the efficiency of heat transfer.

Accordingly, the present invention provides a first exchangeable additive manufacturing machine system. The first system includes a thermal conducting module; a manufacturing platform and a plurality of flat additive manufacturing assembly components, wherein the plurality of flat additive manufacturing assembly components are selectively attached to a center portion of the thermal conducting module to form a working well, the manufacturing platform is selectively configured in the working well and moves along the working well and the manufacturing platform and the working well define a manufacturing region; a manufacturing spindle and a plurality of curve additive manufacturing assembly components, wherein the plurality of curve additive manufacturing assembly components are selectively attached to the center portion of the thermal conducting module to form the working well, the manufacturing spindle is selectively configured to rotate in the working well and the manufacturing spindle and the working well define the manufacturing region; and a capillary based functional liquid releasing module, configured to attach on at least the thermal conducting module to release a functional liquid into a gap included between the thermal conducting module and the manufacturing platform or one of a first gap, a second gap and a third gap included between the thermal conducting module and the manufacturing spindle, wherein the exchangeable additive manufacturing machine system is formed as a three-dimensional additive manufacturing machine by selectively configuring with the manufacturing platform and the plurality of flat additive manufacturing assembly components or a rotary additive manufacturing machine by selectively configuring with the manufacturing spindle and the plurality of curve additive manufacturing assembly components.

Preferably, the exchangeable additive manufacturing machine system further includes one of: a flat additive manufacturing positioning component; and the plurality of flat additive manufacturing assembly components being attached to the thermal conducting module through guidance of the flat additive manufacturing positioning component, to configure in the center portion to form an inner wall of the working well, so to render the exchangeable additive manufacturing machine system to be formed as the three-dimensional additive manufacturing machine, wherein the gap is included between a first flat additive manufacturing assembly component selected from one of the plurality of flat additive manufacturing assembly components and the manufacturing platform.

Preferably, the capillary based functional liquid releasing module further includes one of: a functional liquid reservoir for reserving a functional liquid; a conveying pipe communicating with the functional liquid reservoir and serving as a part of a conveying path for the functional liquid; at least one conveying channel configured inside the first flat additive manufacturing assembly component and serving as another part of the conveying path; a releasing aperture opened on the first flat additive manufacturing assembly component and communicating with the at least one conveying channel; a capillary releasing channel including an inlet and an outlet, configured on the first flat additive manufacturing assembly component, and having a slope and a width less than 1 mm to drive the functional liquid flowing by a gravity or a capillary force, wherein the outlet is positioned and oriented toward the gap; a peristaltic pump pumping the functional liquid out of from the reservoir and conveying it to the releasing aperture through the conveying pipe so as to convey the functional liquid to arrive the capillary releasing channel, wherein the functional liquid is driven to the outlet by the gravity or the capillary force, flows into the gap and diffuses in the gap with no difference due to the driving of the capillary force; and a controller controlling the peristaltic pump to activate periodically or non-periodically to drive the functional liquid flowing to the releasing aperture.

Preferably, the thermal conducting module further includes one of: a curve additive manufacturing positioning component and a first bearing bore, wherein the first bearing bore provides for the manufacturing spindle to pass through to enter into the working well, wherein the first gap is included between the first bearing bore and the manufacturing spindle; and the plurality of curve additive manufacturing assembly components being attached to the thermal conducting module through guidance of the curve additive manufacturing positioning component, to configure in the center portion to form an inner wall of the working well, so to render the exchangeable additive manufacturing machine system to be formed as the rotary additive manufacturing machine, wherein a first curve additive manufacturing assembly component selected from one of the plurality of curve additive manufacturing assembly components further includes a second bearing bore to provide for the manufacturing spindle to pass through to enter into the working well, and the second gap is included between the second bearing bore and the manufacturing spindle, wherein a second curve additive manufacturing assembly component selected from one of the plurality of curve additive manufacturing assembly components further includes a third bearing bore to contain a part of the manufacturing spindle, and the third gap is included between the second third bore and the manufacturing spindle.

Preferably, the capillary based functional liquid releasing module further includes one of: a functional liquid reservoir for reserving a functional liquid; a conveying pipe communicating with the functional liquid reservoir and serving as a part of a conveying path for the functional liquid; at least one conveying channel configured inside the first curve additive manufacturing assembly component and serving as another part of the conveying path; a releasing aperture opened on the first curve additive manufacturing assembly component and communicating with the at least one conveying channel, wherein the releasing aperture is positioned and oriented toward one of the first gap, the second gap and the third gap; a peristaltic pump pumping the functional liquid out of from the reservoir and conveying it to the releasing aperture through the conveying pipe so as to convey the functional liquid to arrive the capillary releasing channel, wherein the functional liquid is driven to the outlet by the gravity or the capillary force, flows into the gap and diffuses in the gap with no difference due to the driving of the capillary force; and a controller controlling the peristaltic pump to activate periodically or non-periodically to drive the functional liquid flowing to the releasing aperture.

The present invention further provides a second exchangeable additive manufacturing machine system. The second system includes a manufacturing platform; a thermal conducting module configured to include a working well in a center portion, wherein the manufacturing platform is configured in the working well and moves along the working well and the manufacturing platform and the working well defines a manufacturing region; and a capillary based functional liquid releasing module configured on the thermal conducting module to release a functional liquid to a gap included between the thermal conducting module and the manufacturing platform.

The present invention further provides a third exchangeable additive manufacturing machine system. The third system includes a manufacturing spindle; a thermal conducting module configured to include a working well in a center portion, wherein the manufacturing spindle is configured to rotate in the working well and the manufacturing spindle and the working well defines a manufacturing region; and a capillary based functional liquid releasing module configured on the thermal conducting module to release a functional liquid to one of a first gap, a second gap and a third gap included between the thermal conducting module and the manufacturing platform.

The above content described in the summary is intended to provide a simplified summary for the presently disclosed invention, so that readers are able to have an initial and basic understanding to the presently disclosed invention. The above content is not aimed to reveal or disclose a comprehensive and detailed description for the present invention, and is never intended to indicate essential elements in various embodiments in the present invention, or define the scope or coverage in the present invention.

DESCRIPTION OF THE DRAWINGS

A more complete appreciation of the invention and many of the attendant advantages thereof are readily obtained as the same become better understood by reference to the following detailed description when considered in connection with the accompanying drawing, wherein.

DETAILED DESCRIPTION

Figure 1:
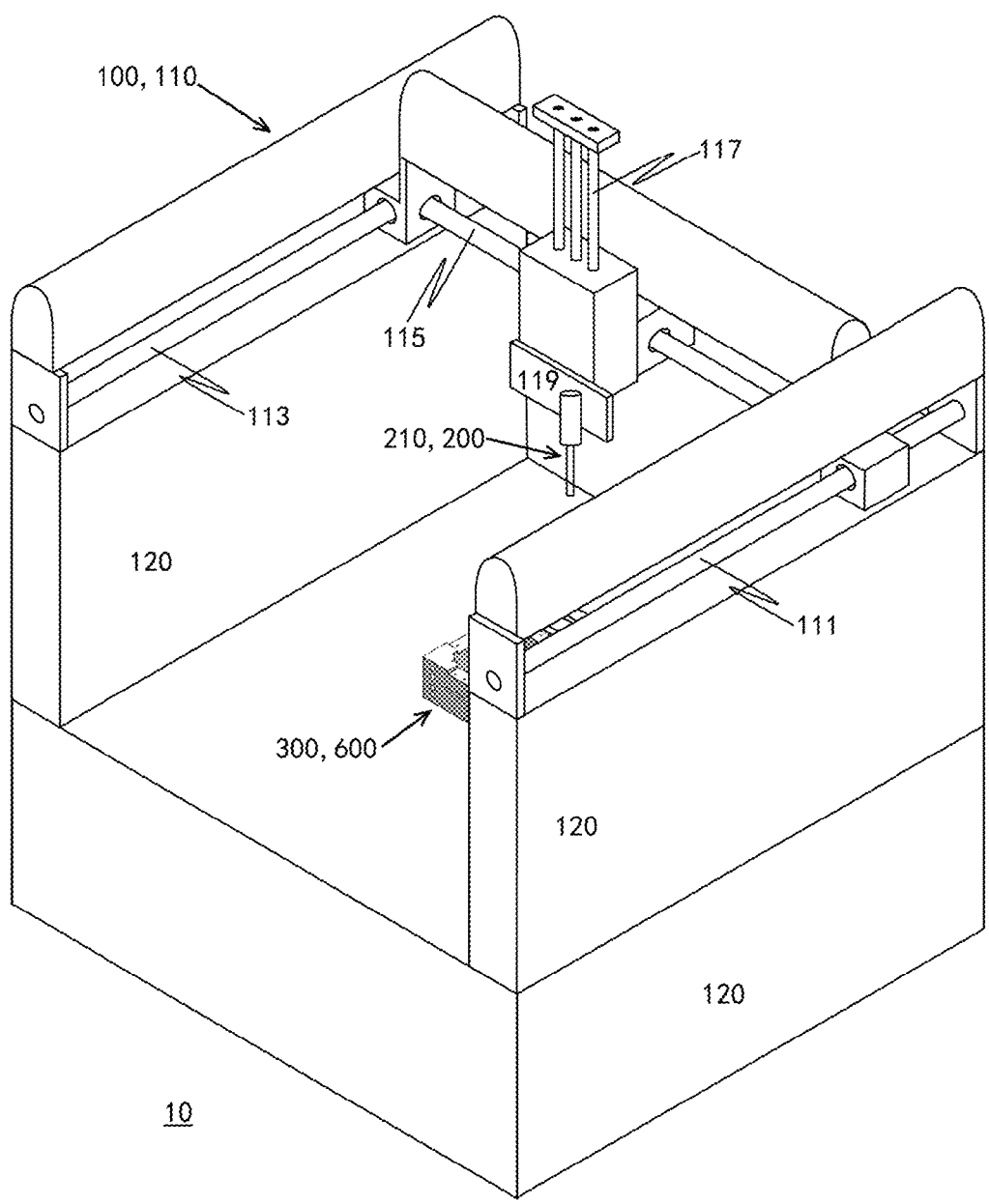
FIG. 1 is a schematic diagram illustrating an overall system for a three-dimensional additive manufacturing machine with a capillary based functional liquid releasing module in accordance with the present invention.

The present disclosure will be described with respect to particular embodiments and with reference to certain drawings, but the disclosure is not limited thereto but is only limited by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice.

It is to be noticed that the term "including," used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device including means A and B" should not be limited to devices consisting only of components A and B.

The disclosure will now be described by a detailed description of several embodiments. It is clear that other embodiments be configured according to the knowledge of persons skilled in the art without departing from the true technical teaching of the present disclosure, the claimed disclosure being limited only by the terms of the appended claims.

FIG. 1 to FIG. 5 are schematic diagrams illustrating a first embodiment for the exchangeable additive manufacturing machine system with a capillary based functional liquid releasing module in accordance with the present invention. FIG. 1 is a schematic diagram illustrating an overall system for a three-dimensional additive manufacturing machine with a capillary based functional liquid releasing module in accordance with the present invention. The exchangeable additive manufacturing machine system according to the present invention is alternatively configured as a semi-enclosed three-dimensional additive manufacturing machine of the first embodiment and the rotary additive manufacturing machine of the second embodiment by simply replacing the components. The three-dimensional additive manufacturing machine is preferably a three-dimensional bioprinter and is used to perform flat additive manufacturing operations based on the movement in three-dimensional rectangular coordinate system. The rotary additive manufacturing machine is preferably a rotary bioprinter and is used to perform curve additive manufacturing operations based on the movement in three-dimensional rectangular coordinate system combined with rotational motion.

In the first embodiment, as shown in FIG. 1, the exchangeable additive manufacturing machine system according to the present invention is preferably configured as a three-dimensional additive manufacturing machine 10, which includes a three-dimensional motion mechanism 100. The three-dimensional motion mechanism 100 is preferably a gantry multi-axis motion platform 110, which preferably includes two X-axis tracks 111 and 113 configured at a bottom 120, a Y-axis track 115, a Z-axis track 117 and a load carrier 119. Wherein the Y-axis track 115 is movably mounted on the X-axis tracks 111 and 113 and is driven by an X-axis linear motor (not shown) to move linearly along the X-axis tracks 111 and 113 to move toward an X-axis direction. The Z-axis track 117 is movably mounted on the Y-axis 115 and is driven by a Y-axis linear motor (not shown) to move linearly along the X-axis tracks 111 and 113 to move toward a Y-axis direction. The carrier 119 is movably mounted on the Z-axis track 117 and is driven by a Z-axis linear motor (not shown) to move linearly along the Z-axis track 117 to move toward a Z-axis direction. The carrier 119 provides the installation of a nozzle 210. After the nozzle 210 is installed on the carrier 119, it will perform three-axis movements in an X-axis direction, a Y-axis direction, and a Z-axis direction according to a pre-planned and set path.

In one embodiment, the maximum movement range of the gantry multi-axis motion platform 110 in the X-axis direction, the Y-axis direction, and the Z-axis direction is preferably 486×486×196 mm There are external optical scale feedback modules and horizontal correction modules configured on the X-axis tracks 111 and 113, the Y-axis track 115 and the Z-track 117. The overall positioning accuracy of the platform can reach ±1 μm.

The three-dimensional additive manufacturing machine 10 further includes an additive manufacturing module 200. The additive manufacturing module 200 includes a manufacturing material supply unit (not shown) and a nozzle 210. The manufacturing material supply module supplies manufacturing materials to the nozzle 210 through the material pipeline. The nozzle 210 is mounted on the gantry multi-axis motion platform 110 through the carrier 119 to perform three-axis movements in an X-axis direction, a Y-axis direction, and a Z-axis direction. The nozzle 210 is preferably, for example, but not limited to, an extrusion nozzle or an inkjet nozzle, and is used to output a manufacturing material for three-dimensional additive manufacturing. The manufacturing material is preferably, for example, but not limited to, biodegradable polyurethane (Bio-PU) materials.

The three-dimensional additive manufacturing machine 10 further includes a thermal conducting module 300 arranged below the motion range of the gantry multi-axis motion platform 110 and a capillary based functional liquid releasing module 600 arranged above the thermal conducting module 300.

Figure 2A:
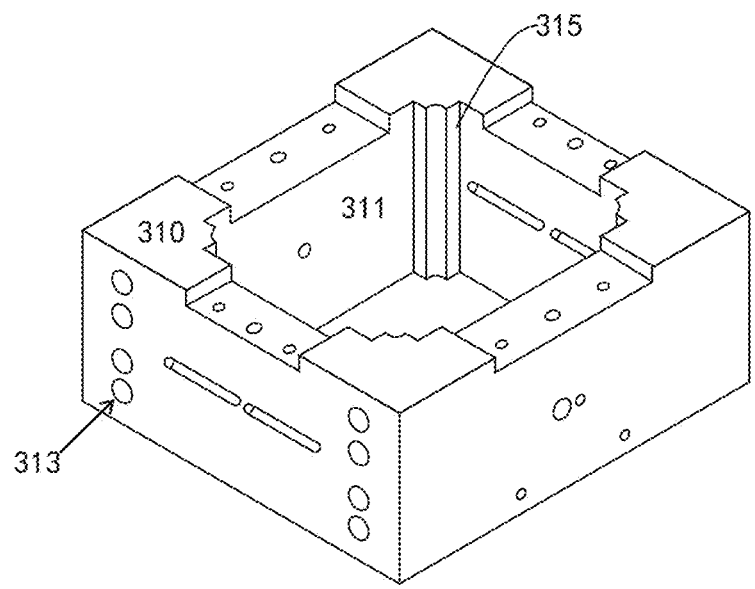
FIG. 2(a) is a schematic diagram illustrating a structure for a thermal conducting base included in the first embodiment of the thermal conducting module included in the three-dimensional additive manufacturing machine with the capillary based functional liquid releasing module in accordance with the present invention.
Figure 2B:
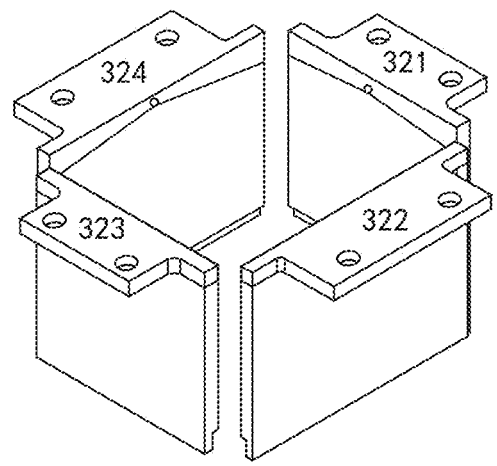
FIG. 2(b) is a schematic diagram illustrating a structure for a flat additive manufacturing assembly components included in the first embodiment of the thermal conducting module included in the three-dimensional additive manufacturing machine with the capillary based functional liquid releasing module in accordance with the present invention.
Figure 2C:
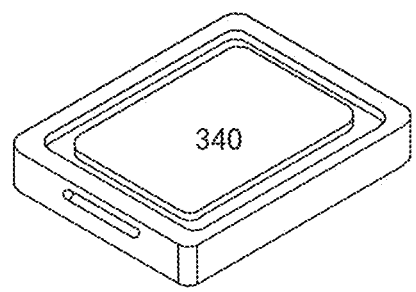
FIG. 2(c) is a schematic diagram illustrating a structure for a lifting manufacturing platform included in the first embodiment of the thermal conducting module included in the three-dimensional additive manufacturing machine with the capillary based functional liquid releasing module in accordance with the present invention.
Figure 3:
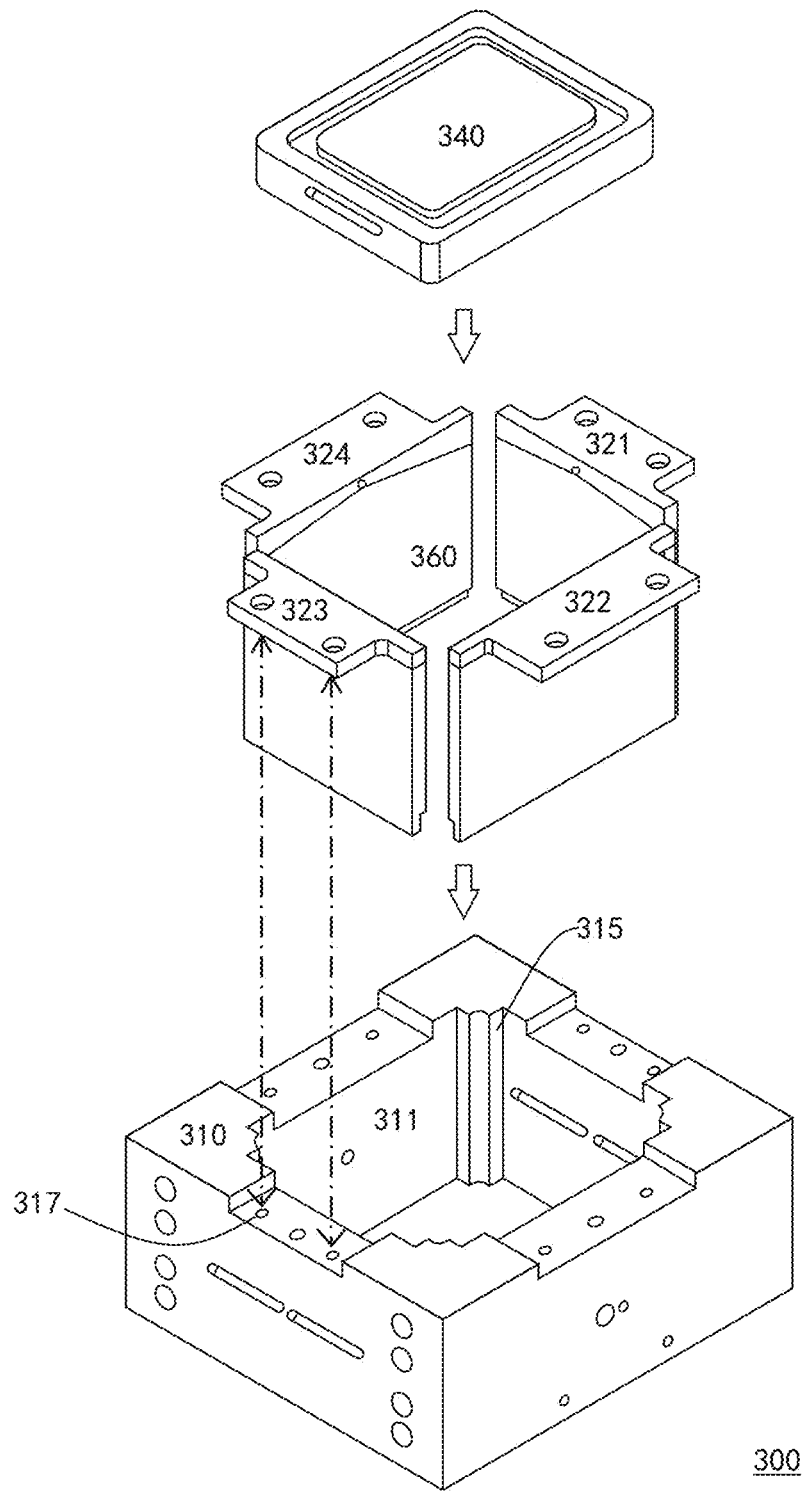
FIG. 3 is a schematic diagram illustrating a structural assembly for the first embodiment of the thermal conducting module in accordance with the present invention.
Figure 4A:
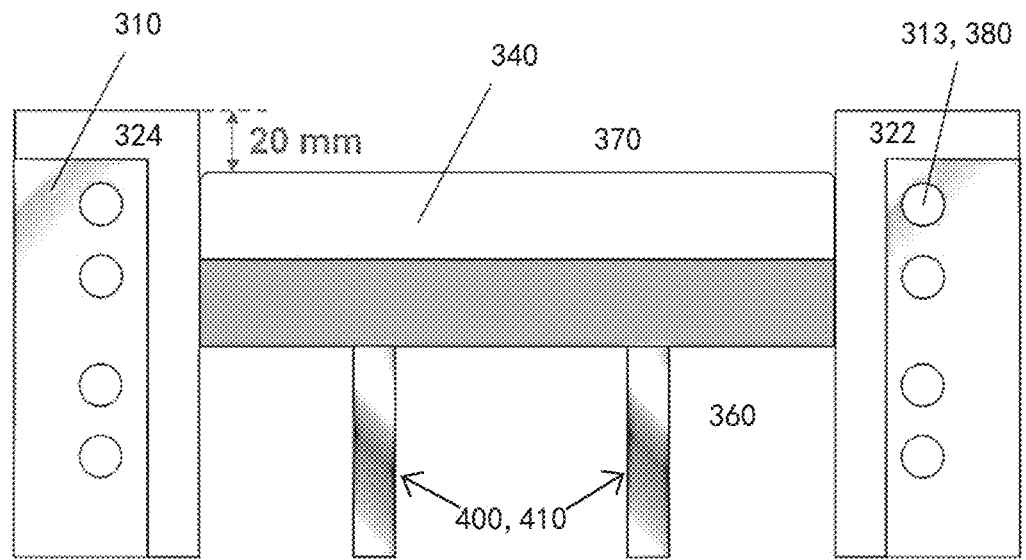
FIG. 4(a) is a cross-sectional side view schematic diagram illustrating an overall structure for the first embodiment of the thermal conducting module in accordance with the present invention.
Figure 4B:
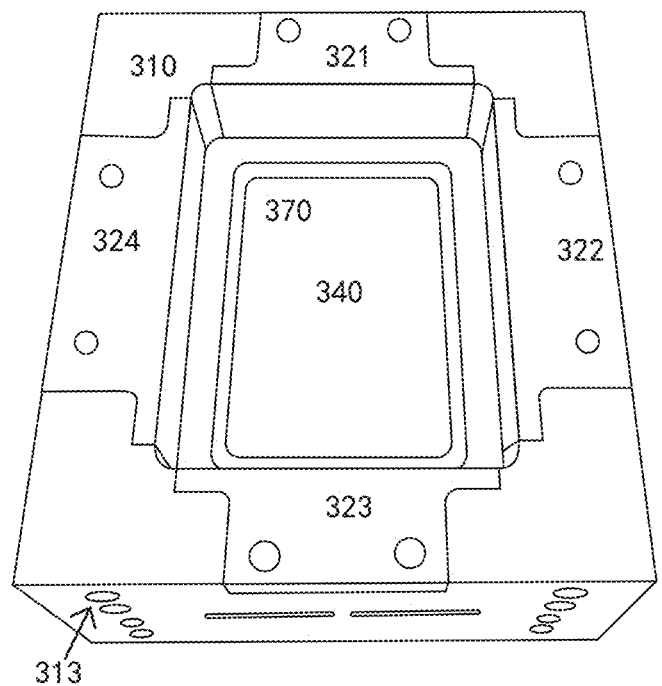
FIG. 4(b) is a schematic diagram illustrating an overall structure for the first embodiment of the thermal conducting module in accordance with the present invention.

FIG. 2(a) is a schematic diagram illustrating a structure for a thermal conducting base included in the first embodiment of the thermal conducting module included in the three-dimensional additive manufacturing machine with the capillary based functional liquid releasing module in accordance with the present invention. FIG. 2(b) is a schematic diagram illustrating a structure for a flat additive manufacturing assembly components included in the first embodiment of the thermal conducting module included in the three-dimensional additive manufacturing machine with the capillary based functional liquid releasing module in accordance with the present invention. FIG. 2(c) is a schematic diagram illustrating a structure for a lifting manufacturing platform included in the first embodiment of the thermal conducting module included in the three-dimensional additive manufacturing machine with the capillary based functional liquid releasing module in accordance with the present invention. FIG. 3 is a schematic diagram illustrating a structural assembly for the first embodiment of the thermal conducting module in accordance with the present invention. FIG. 4(a) is a cross-sectional side view schematic diagram illustrating an overall structure for the first embodiment of the thermal conducting module in accordance with the present invention. FIG. 4(b) is a schematic diagram illustrating an overall structure for the first embodiment of the thermal conducting module in accordance with the present invention.

The three-dimensional additive manufacturing machine 10 further includes a thermal conducting module 300. The thermal conducting module 300 includes a thermal conducting base 310, a plurality of flat additive manufacturing assembly components 321, 322, 323 and 324, and a lifting manufacturing platform 340, etc. The geometric structure of the thermal conducting base 310 is preferably a frame-shaped structure, and a rectangular channel 311 is formed in the center of the frame-shaped structure, and a plurality of medium channels 313 are included in the structure to provide the heat transfer medium 380 to flow therein. A series of positioning components configured on the inner surface of the rectangular channel 311 includes a plurality of positioning grooves 315 and assembly holes 317, therefore flat additive manufacturing assembly components 321, 322, 323 and 324 can combine to the thermal conducting base 310 according to the positioning grooves 315 and the assembly holes 317.

Furthermore, the geometric structure of the thermal conducting base 310 is preferably a geometric shape, such as, but not limited to, rectangle, circle, ellipse, etc. The material of the thermal conducting base 310 is preferably stainless steel, which is corrosion-resistant and easy to be sterilized.

The plurality of flat additive manufacturing assembly components 321, 322, 323 and 324 are mainly installed on the inner surface of the rectangular channel 311 of the thermal conducting base 310 to form a working well 360. The four flat additive manufacturing assembly components 321, 322, 323 and 324 can provide flat surfaces for the four inner walls of the working well 360, therefore the manufacturing platform 340 is embedded in the working well 360 and moved along the working well 360, e.g., raised or lowered, to change the position and height of the manufacturing platform 340 in the Z-axis direction. The working well 360 and the manufacturing platform 340 will jointly define a depth-height variable manufacturing area 370.

The three-dimensional additive manufacturing machine 10 according to the present invention further includes a manufacturing platform controlling module 400. The manufacturing platform controlling module 400 includes a linear motor (not shown) and one or more drive shaft 410, wherein the drive shaft 410 is arranged below the manufacturing platform 340. The linear motor drives the manufacturing platform 340 to move along the working well 360 through the drive shaft 410.

In the three-dimensional additive manufacturing machine 10 according to the present invention, the additive manufacturing will be performed in the manufacturing area 370 above the lifting manufacturing platform 340. The nozzle 210 is controlled by the gantry multi-axis motion platform 110, and is positioned within the range of the manufacturing area 370 for additive manufacturing. The manufacturing platform 340 is driven to move up and down along the working well 360 in the Z-axis direction, therefore in the process of manufacturing the same layer of deposition structure or the entire additive manufacturing process, the height of the nozzle 210 in the Z-axis direction is fixed, and the nozzle 210 is driven to move in the X-axis and Y-axis directions on the XY plane only. In addition, by changing the height of the manufacturing platform 340 in the Z-axis direction, the effect of layer-by-layer additive manufacturing is achieved.

The three-dimensional additive manufacturing machine 10 also includes a temperature circulated controlling module, which includes a circulated cooling unit and a circulated heating unit. The circulated cooling unit is preferably, for example, but not limited to, a refrigerated circulator, which actively cools the heat transfer medium 380 to a preset temperature, and then the cooled heat transfer medium 380 is pumped to the medium channel 313 inside the thermal conducting base 310 through a circulating pipe. Then the heat transfer medium 380 is recovered through the circulating pipe and re-cooled, and the cycle is repeated continuously, thereby the thermal conducting base 310 is cooled to the preset operating temperature. The circulated heating unit is preferably, for example, but not limited to, a heating circulator, which actively heats the heat transfer medium 380 to a preset temperature, and then the heated heat transfer medium 380 is pumped to the medium channel 313 inside the thermal conducting base 310 through a circulating pipe. Then the heat transfer medium 380 is recovered through the circulating pipe and re-heated, and the cycle is repeated continuously, thereby the thermal conducting base 310 is heated to the preset operating temperature. The heat transfer medium 380 is preferably a coolant or a circulating fluid. In this embodiment, the coolant is preferably 99.5% ethanol (ECOH).

Figure 5A:
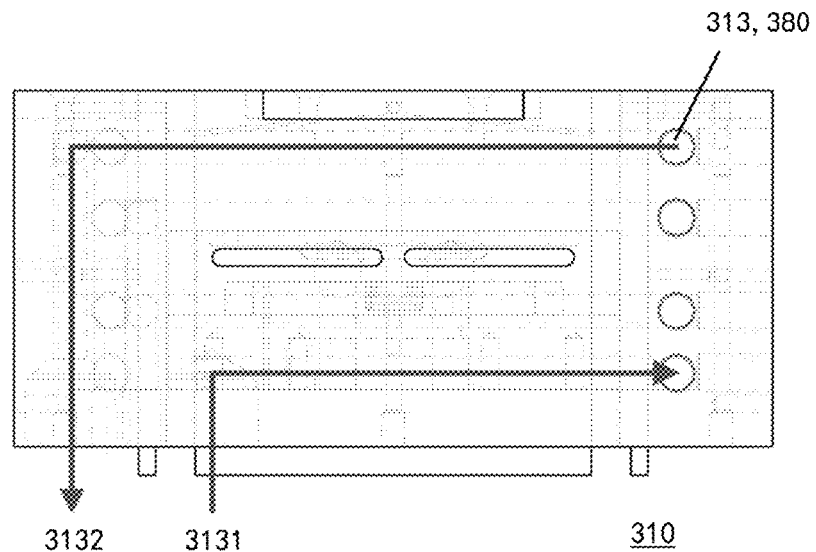
FIG. 5(a) is a cross-sectional side view schematic diagram illustrating a structural arrangement for the medium channel inside the thermal conducting base in accordance with the present invention.
Figure 5B:
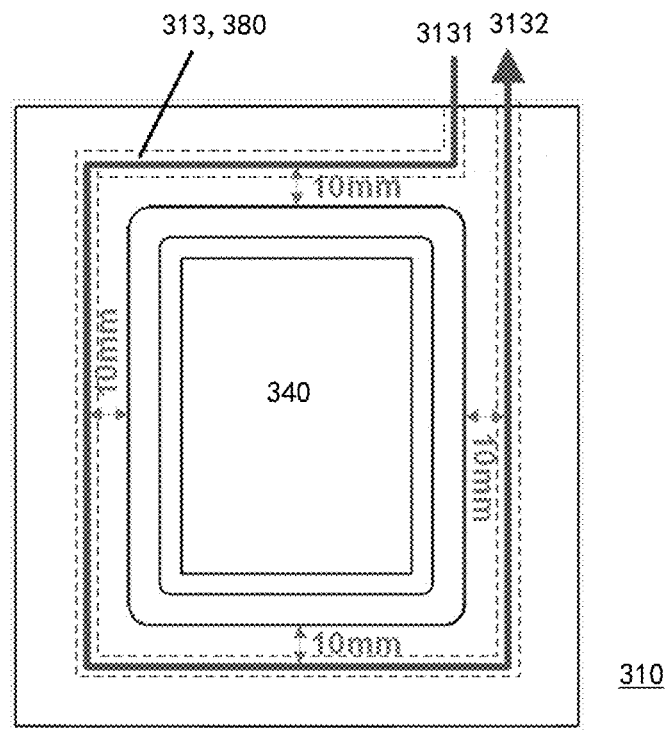
FIG. 5(b) is a top-view schematic diagram illustrating a structural arrangement for the medium channel inside the thermal conducting base in accordance with the present invention.

FIG. 5(a) is a cross-sectional side view schematic diagram illustrating a structural arrangement for the medium channel inside the thermal conducting base according to the present invention. FIG. 5(b) is a top-view schematic diagram illustrating a structural arrangement for the medium channel inside the thermal conducting base in accordance with the present invention. In the internal structure configuration of the thermal conducting base 310, the medium channel 313 is configured to a multi-layer configuration, wherein each layer of the medium channels 313 is arranged in a circle at a certain height. It helps to make the temperature distribution of the manufacturing platform 340 more consistent during the lifting and lowering process of the working well 360. An inlet 3131 of the medium channel 313 is arranged at the lower layer of the thermal conducting base 310, and an outlet 3132 is arranged at the upper layer of the thermal conducting base 310. When the manufacturing process is turn into the manufacturing of the higher layer structure, such as, but not limited to, the manufacturing of the higher-layer bioscaffold structure, the manufacturing platform 340 is closer to the inlet 3131 after the height is going down. The heat transfer medium 380 near the inlet 3131 will be in a cooler or hotter status due to less energy dissipation, accordingly the heat transfer efficiency is improved.

During the additive manufacturing process, the heat transfer medium 380 is supplied by the temperature circulated controlling module. The heated or cooled heat transfer medium 380 is pumped by the temperature circulated controlling module and transported to the inlet 3131 of the medium channel 313, then entered the medium channel 313, and circulated inside the thermal conducting base 310 to cool or heat the thermal conducting base 310. The energy will be transmitted through the thermal conducting base 310 to the flat additive manufacturing assembly components 321, 322, 323 and 324 around the working well 360, and then transported to the central manufacturing platform 340 thorough contact conduction. Therefore, the manufacturing platform 340 is cooled or heated, and the energy is transferred to the deposited manufacturing materials on the manufacturing platform 340.

Figure 6:
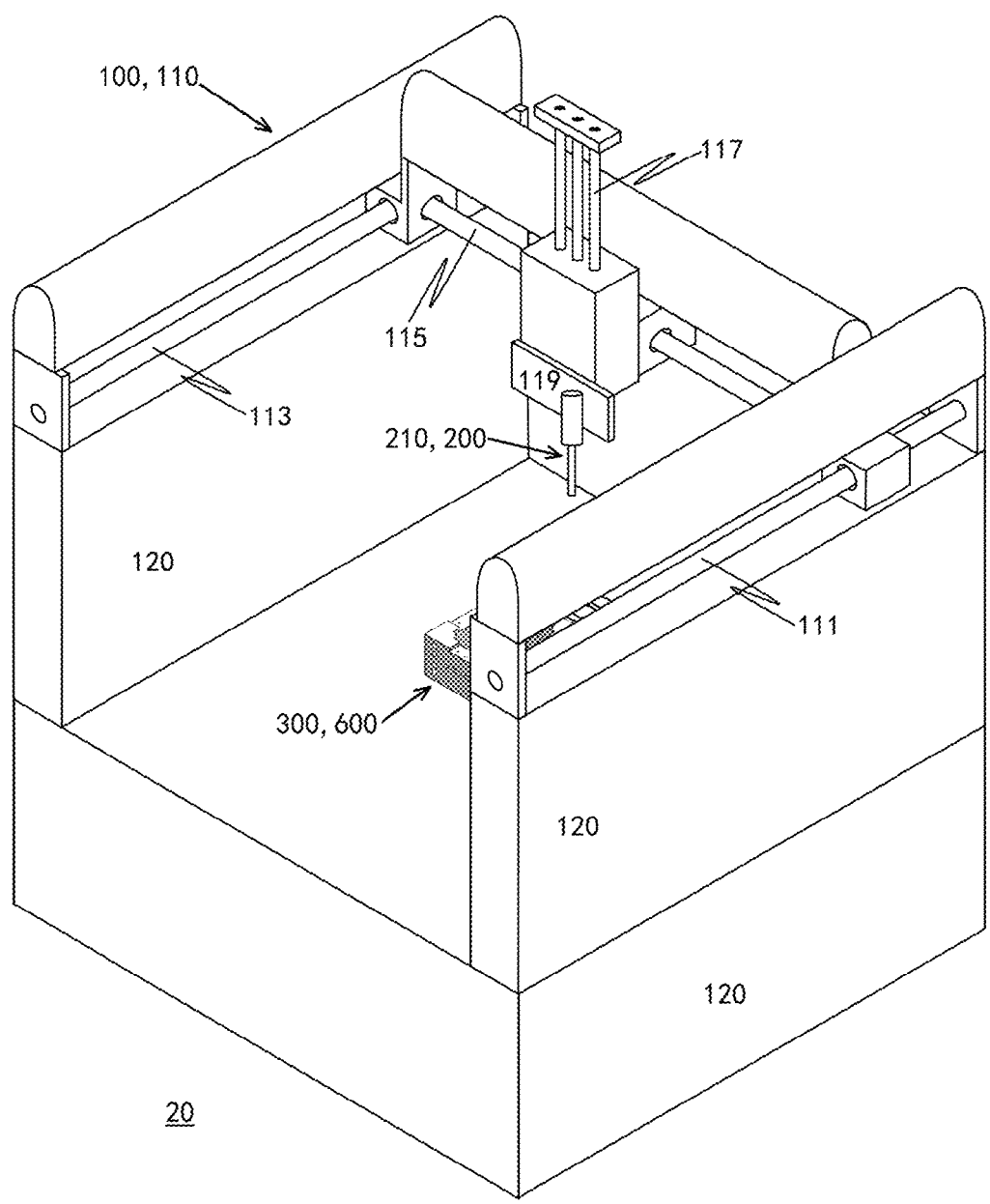
FIG. 6 is a schematic diagram illustrating a rotary additive manufacturing machine with a capillary based functional liquid releasing module in accordance with the present invention.

FIG. 6 to FIG. 10 are schematic diagrams illustrating a second embodiment of an exchangeable additive manufacturing machine system with a capillary based functional liquid releasing module in accordance with the present invention. FIG. 6 is a schematic diagram illustrating a rotary additive manufacturing machine with a capillary based functional liquid releasing module in accordance with the present invention. In the second embodiment, the exchangeable additive manufacturing machine system according to the present invention is preferably configured as a rotary additive manufacturing machine 20, which includes the first embodiment and at least the three-dimensional motion mechanism 100 disclosed in the first embodiment, an additive manufacturing module 200, a thermal conducting module 300, a temperature circulated controlling module, a capillary based functional liquid releasing module module 600, etc.

Figure 7A:
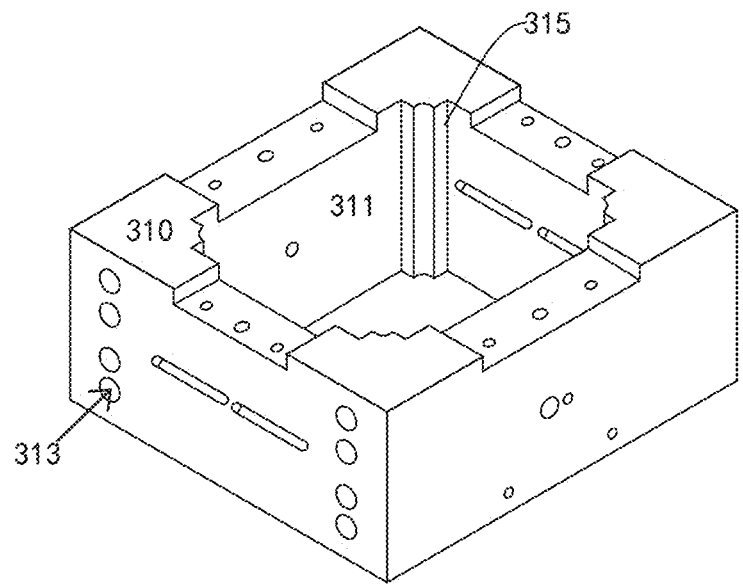
FIG. 7(a) is a schematic diagram illustrating a structure for a thermal conducting base included in the second embodiment of a thermal conducting module in accordance with the present invention.
Figure 7B:
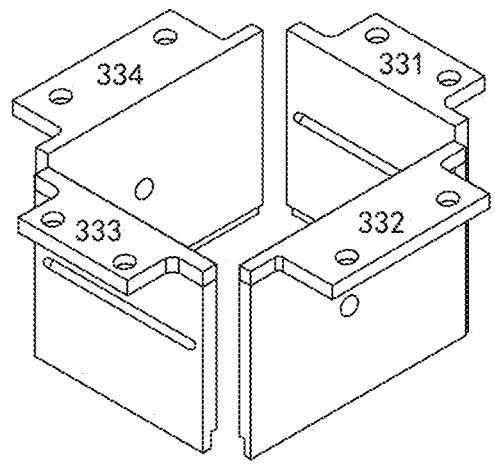
FIG. 7(b) is a schematic diagram illustrating a structure for a curve additive manufacturing assembly component included in the second embodiment of the thermal conducting module in accordance with the present invention.
Figure 7C:
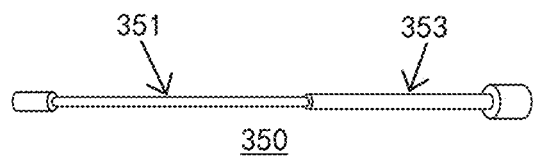
FIG. 7(c) is a schematic diagram illustrating a structure for a manufacturing spindle included in the second embodiment of the thermal conducting module in accordance with the present invention.
Figure 8:
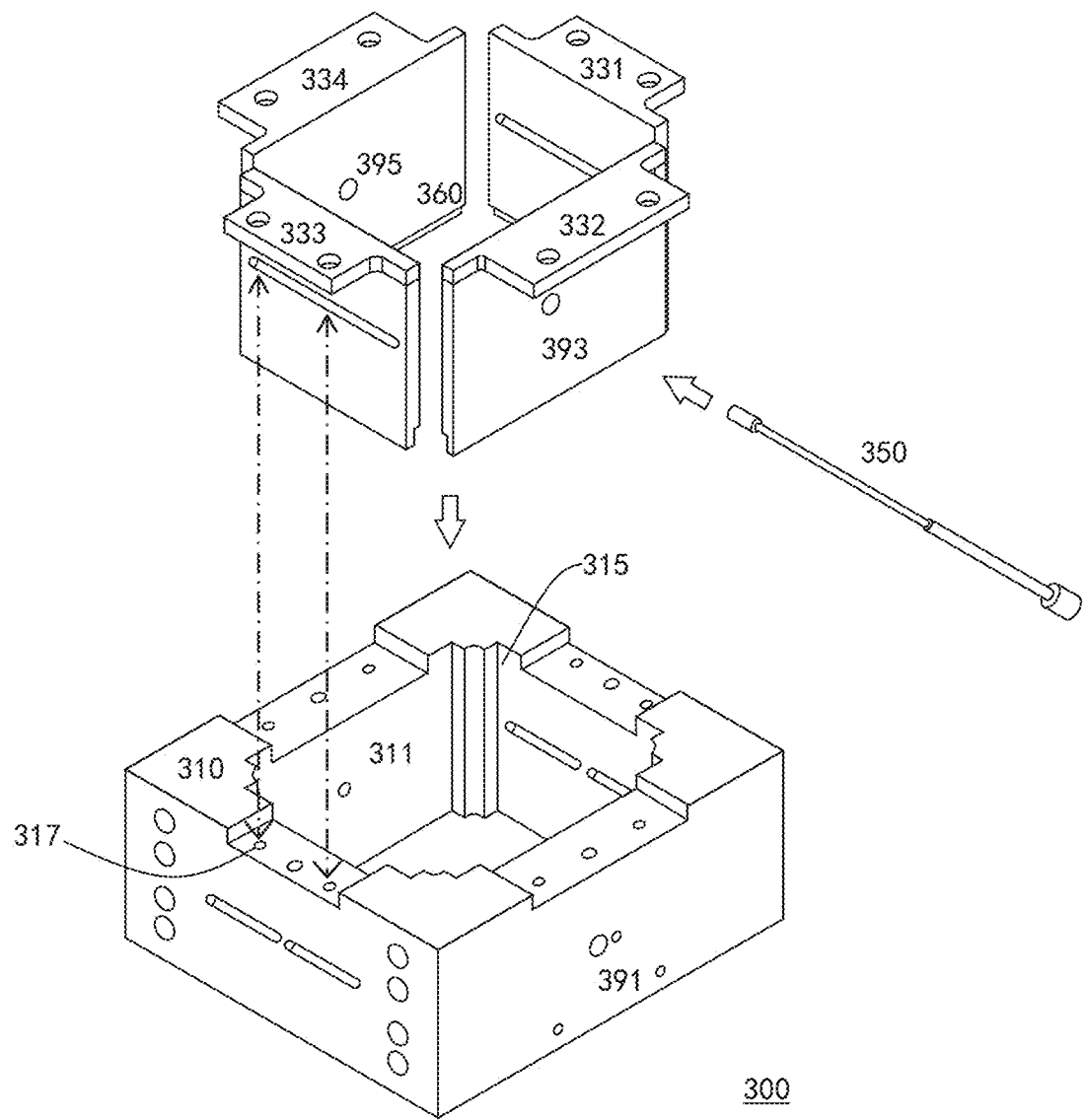
FIG. 8 is a schematic diagram illustrating a structural assembly for the second embodiment of the thermal conducting module in accordance with the present invention.
Figure 9A:
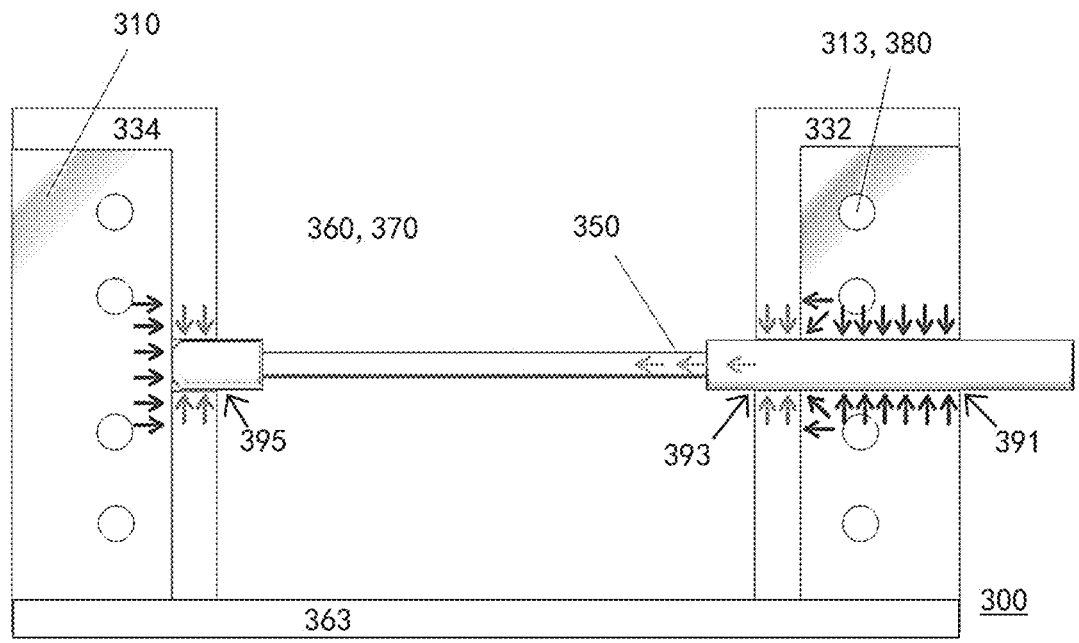
FIG. 9(a) is a cross-sectional side view schematic diagram illustrating an overall structure for the second embodiment of the thermal conducting module in accordance with the present invention.
Figure 9B:
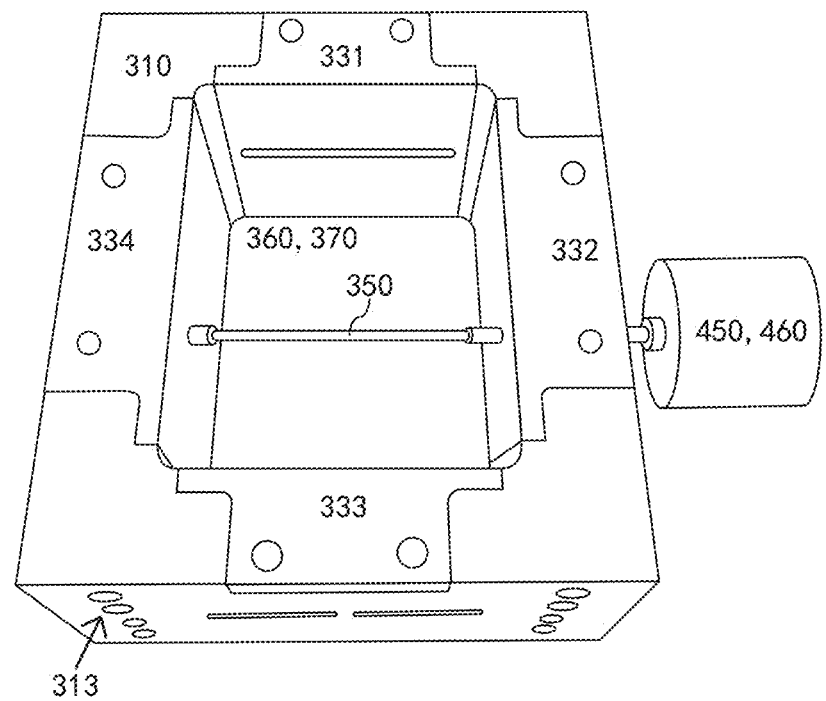
FIG. 9(b) is a schematic diagram illustrating an overall structure for the second embodiment of the thermal conducting module in accordance with the present invention.

FIG. 7(a) is a schematic diagram illustrating a structure for a thermal conducting base included in the second embodiment of a thermal conducting module in accordance with the present invention. FIG. 7(b) is a schematic diagram illustrating a structure for a curve additive manufacturing assembly component included in the second embodiment of the thermal conducting module in accordance with the present invention. FIG. 7(c) is a schematic diagram illustrating a structure for a manufacturing spindle included in the second embodiment of the thermal conducting module in accordance with the present invention. FIG. 8 is a schematic diagram illustrating a structural assembly for the second embodiment of the thermal conducting module in accordance with the present invention. FIG. 9(a) is a cross-sectional side view schematic diagram illustrating an overall structure for the second embodiment of the thermal conducting module in accordance with the present invention. FIG. 9(b) is a schematic diagram illustrating an overall structure for the second embodiment of the thermal conducting module in accordance with the present invention.

The rotary additive manufacturing machine 20 further includes the thermal conducting module 300 disclosed in the first embodiment. The thermal conducting module 300 includes a thermal conducting base 310, a plurality of curve additive manufacturing assembly components 331, 332, 333 and 334, and a manufacturing spindle 350, etc. The interior of the thermal conducting base 310 includes a medium channel 313 for providing the heat transfer medium 380 to flow therein. The thermal conducting base 310 includes a plurality of positioning grooves 315 and assembly holes 317, therefore curve additive manufacturing assembly components 321, 322, 323 and 324 can combine to the thermal conducting base 310 according to the positioning grooves 315 and the assembly holes 317, and then a working well 360 is formed.

In order to make assembly and disassembly easier, the assembly system of the manufacturing spindle 350 utilizes a single-side insertion method. The manufacturing spindle 350 sequentially passes through a first bearing bore 391 opened on the thermal conducting base 310, a second bearing bore 393 on the corresponding curve additive manufacturing assembly component 332, and is inserted into a third bearing bore 395 on the opposite curve additive manufacturing assembly component 334. The manufacturing spindle 350 inserted into the third bearing bore 395 will not contact the thermal conducting base 310 behind the curve additive manufacturing assembly component 333 to reduce friction during rotation. The energy is transferred to the manufacturing spindle 350 through the first bearing bore 391, the second bearing bore 393 and the third bearing bore 395, which contact with the manufacturing spindle 350. A bottom plate 363 is further included under the thermal conducting base 310 to seal the bottom of the working well 360, thus the manufacturing area 370 is formed as a five-sided enclosed space.

The rotary additive manufacturing machine 20 according to the present invention further includes a rotary motion controlling module 450. The rotary motion controlling module 450 includes a step motor 460. The manufacturing spindle 350 is preferably driven by the step motor 460 of the rotary motion controlling module 450.

In the rotary additive manufacturing machine 20 according to the present invention, the additive manufacturing is performed in the manufacturing area 370 above the manufacturing spindle 350. The additive manufacturing is performed by the nozzle 210 within the range of the manufacturing area 370. The rotary additive manufacturing machine 20 is mainly used for the production of, for example, but not limited to, three-dimensional tubular structures.

Figure 10:
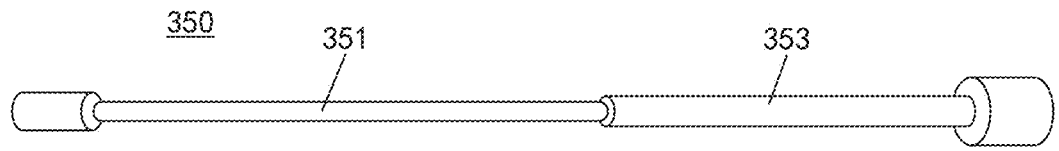
FIG. 10 is a cross-sectional side view schematic diagram illustrating a two-stage structure for a manufacturing spindle included in the second embodiment of the thermal conducting module in accordance with the present invention.

FIG. 10 is a cross-sectional side view schematic diagram illustrating a two-stage structure for a manufacturing spindle included in the second embodiment of the thermal conducting module in accordance with the present invention. Since the additive manufacturing is performed on the manufacturing spindle 350, after the additive manufacturing is completed, the finished product is attached to the manufacturing spindle 350. As a result, the manufacturing spindle 350 cannot be directly pull away from the first bearing bore 391, the second bearing bore 393 and the third bearing bore 395.

Therefore, in the rotary additive manufacturing machine 20 according to the present invention, the manufacturing spindle 350 is designed as a two-stage structure. The manufacturing spindle 350 includes a connecting section 351 and a manufacturing section 353 through screwing. Therefore, in the manufacturing spindle 350 according to the present invention, after the curve additive manufacturing layer is completed, the manufacturing section 353 is directly removed from the interior of the working well 360 to avoid damage to the finished product.

The exchangeable additive manufacturing machine system according to the present invention includes at least the three-dimensional additive manufacturing machine 10 of the first embodiment and the rotary additive manufacturing machine 20 of the second embodiment. The design concept is to limit the temperature control range of the additive manufacturing process to only the five-sided enclosed space or semi-enclosed space, i.e., the manufacturing area 370, formed by the four inner walls of the working well 360 and the manufacturing platform 340 or the manufacturing spindle 350, thereby the temperature control range of the additive manufacturing process is greatly reduced, and the heat conducting efficiency is effectively improved. Thus, the overall performance and energy consumption of the machine has significantly improved.

The exchangeable additive manufacturing machine system according to the present invention is configured into at least two different configurations by simply replacing flat additive manufacturing assembly components 321, 322, 323 and 324, and curve additive manufacturing assembly components 331, 332, 333 and 334 on the thermal conducting pedestal 310 to be switched between the different configurations of the three-dimensional additive manufacturing machine 10 and the rotary additive manufacturing machine 20, without changing the three-dimensional motion mechanism 100, the additive manufacturing module 200, the temperature circulated controlling module, and the capillary based functional liquid releasing module 600.

But for the three-dimensional additive manufacturing machine 10 and the rotary additive manufacturing machine 20, when the operating temperature needs to be lower than 0° C., the assembly components at low-temperature included in the machine are easily to be frosted after contacting with moisture in the air.

During the manufacturing, if the manufacturing platform needs to stay at a certain height position for a period of time, or the manufacturing spindle needs to suspend rotation for a period of time, the assembly seam between the working well or the assembly components and the manufacturing platform or the manufacturing spindle is easily formed frozen, resulting in jitters, or sticks, etc., while the manufacturing platform moves, or the manufacturing spindles cannot rotate evenly. In severe cases, the manufacturing platform is stuck in the working well and cannot move, or the manufacturing spindle cannot rotate. Consequently, the manufacturing process is interrupted, maybe the machine is also damaged.

The conventional solution is to manually add an antifreeze to reduce or dissolve the resulting frost. But manual addition of an antifreeze not only requires suspending manufacturing operations and prolongs manufacturing time, but also may contaminate semi-finished products in manufacturing due to human error.

Furthermore, no matter it is the three-dimensional additive manufacturing machine 10 or the rotary additive manufacturing machine 20, there are tiny gaps between the working well and the movable parts such as the manufacturing platform or the manufacturing spindle. In addition to being prone to freezing below 0° C., the air contained in the gap may also cause lower heat transfer efficiency when the operating temperature is room temperature or higher. The operating temperature of the additive manufacturing process often needs to be varied between 0° C. below or above the freezing point of the waterbody.

To solving the said problems, the present invention develops a module that utilize capillary action to release functional liquids such as an antifreeze or a heat transfer liquid, which the module is able to integrate into an exchangeable additive manufacturing machine system including a three-dimensional additive manufacturing machine 10 and a rotary additive manufacturing machine 20, and does not affect the original function of the exchangeable additive manufacturing machine system. During low temperature operation, it releases, for example but not limited to, an antifreeze to a tiny gap the machine. In addition to removing frost, it can also replace the air contained in the gap. Because air is a good thermal insulation medium, the addition of an antifreeze can improve the efficiency of energy transfer. During room temperature operation, it releases, for example but not limited to, a lubricating liquid to a gap of the machine. In addition to effectively reducing frictional resistance, it can also replace the air contained in the gap and improve the efficiency of heat transfer.

Figure 11:
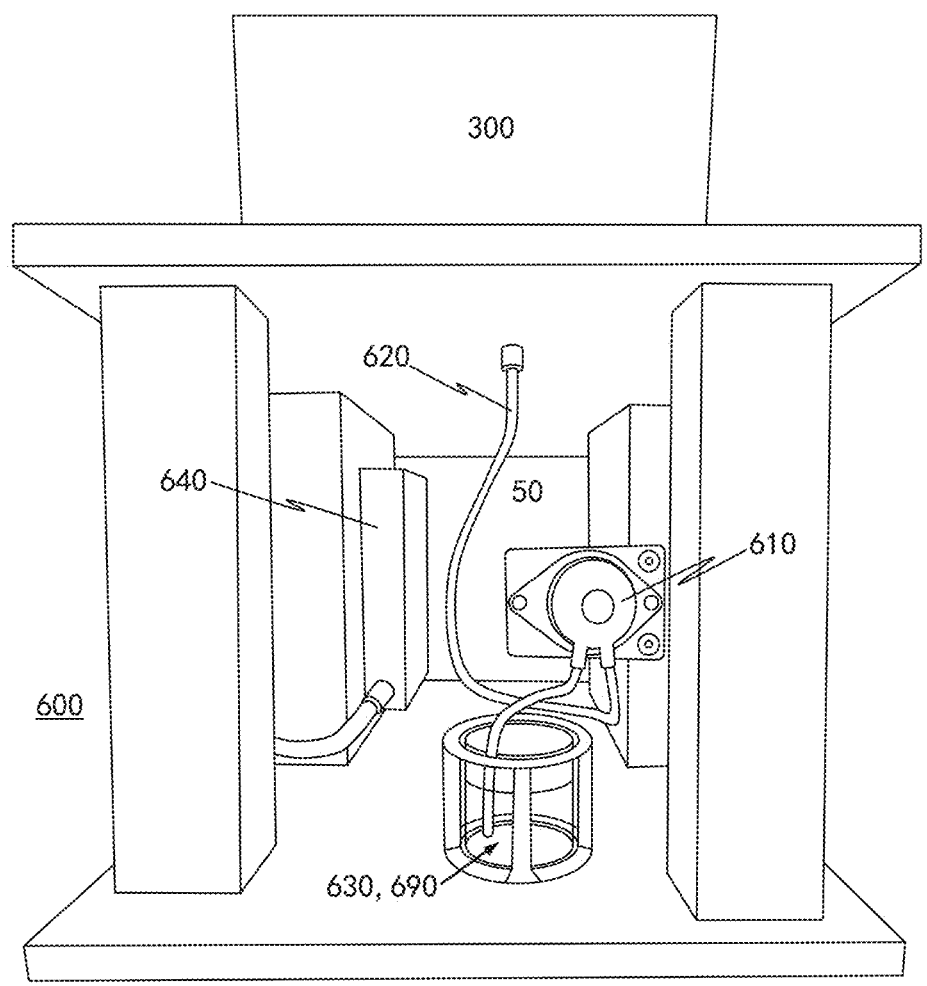
FIG. 11 is a schematic diagram illustrating general components included in a capillary based functional liquid releasing module according to the present invention.
Figure 12A:
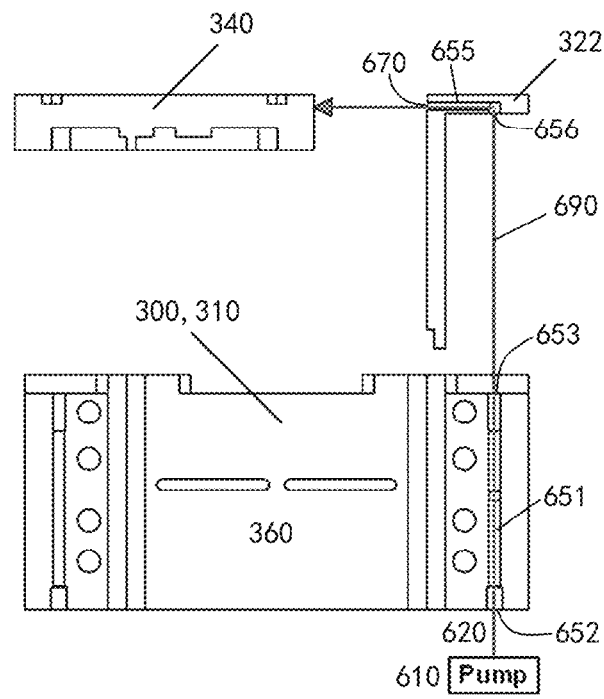
FIG. 12(a) is a cross-sectional exploded-view schematic diagram illustrating a conveying channel included in a capillary based functional liquid releasing module arranged on a three-dimensional additive manufacturing machine.
Figure 12B:
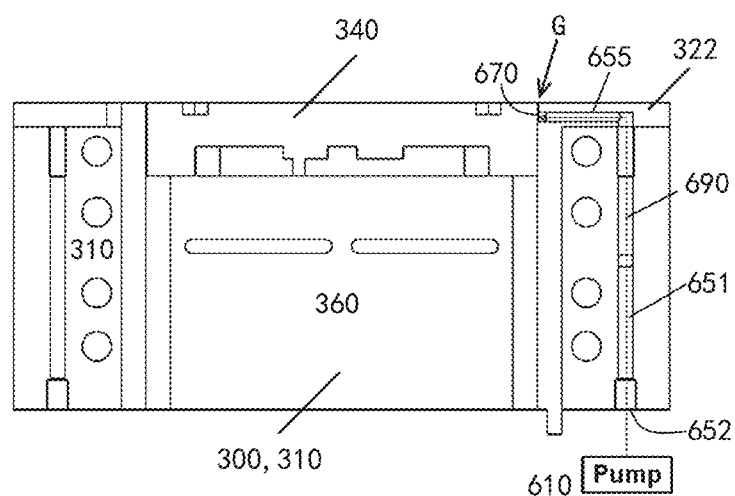
FIG. 12(b) is a cross-sectional structural schematic diagram illustrating a conveying channel included in a capillary based functional liquid releasing module arranged on a three-dimensional additive manufacturing machine.
Figure 13A:
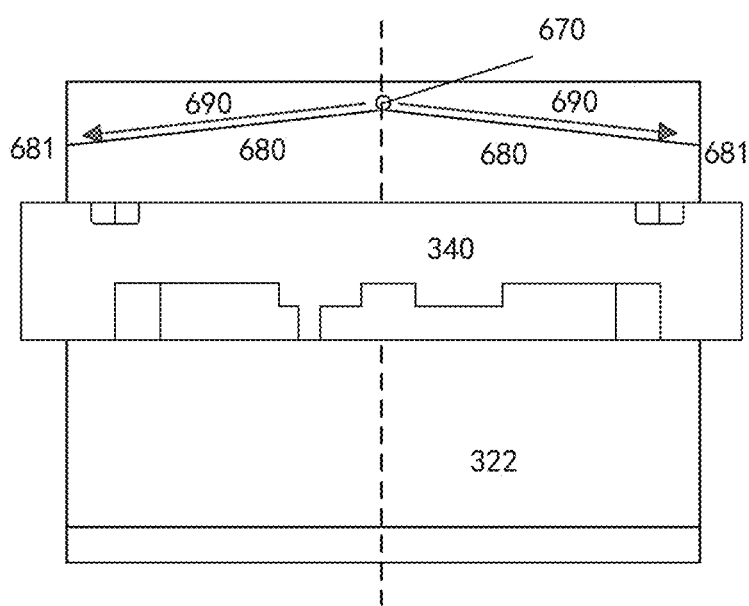
FIG. 13(a) is a front-view schematic diagram illustrating a releasing aperture and a capillary releasing channel included in a capillary based functional liquid releasing module arranged on a flat additive manufacturing assembly component.
Figure 13B:
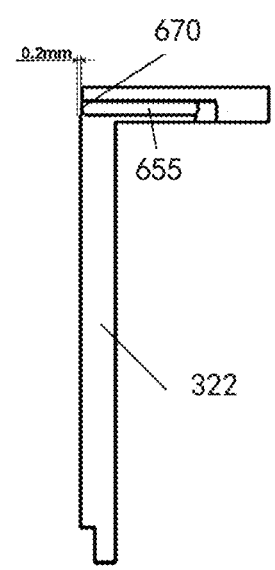
FIG. 13(b) is a cross-sectional schematic diagram illustrating a conveying channel and a conveying channel of the releasing aperture included in a capillary based functional liquid releasing module arranged on a flat additive manufacturing assembly component.

FIG. 11 is a schematic diagram illustrating general components included in a capillary based functional liquid releasing module according to the present invention. FIG. 12(a) is a cross-sectional exploded-view schematic diagram illustrating a conveying channel included in a capillary based functional liquid releasing module arranged on a three-dimensional additive manufacturing machine. FIG. 12(b) is a cross-sectional structural schematic diagram illustrating a conveying channel included in a capillary based functional liquid releasing module arranged on a three-dimensional additive manufacturing machine. FIG. 13(a) is a front-view schematic diagram illustrating a releasing aperture and a capillary releasing channel included in a capillary based functional liquid releasing module arranged on a flat additive manufacturing assembly component. FIG. 13(b) is a cross-sectional schematic diagram illustrating a conveying channel and a conveying channel of the releasing aperture included in a capillary based functional liquid releasing module arranged on a flat additive manufacturing assembly component.

The capillary based functional liquid releasing module 600 proposed by the present invention includes general components such as a peristaltic pump 610, a conveying pipe 620, a functional liquid reservoir 630 and a controller 640, and a conveying channel, a releasing aperture and a capillary releasing channel, which disposed on the thermal conducting module 300 and flat additive manufacturing assembly components 321, 322, 323 and 324, wherein the general components are preferably arranged in a machine space 50 under the thermal conducting module 300.

The structures described below are arranged on each flat additive manufacturing assembly component 321, 322, 323 and 324, but the flat additive manufacturing assembly component 322 is used as an example for illustration below. On the three-dimensional additive manufacturing machine, a first-section conveying channel 651 is configured inside a thermal conducting pedestal 310, an inlet 652 of the first-section conveying channel 651 is set at the bottom of the thermal conducting pedestal 310, and the second-section conveying channel 655, for example but not limited to, is arranged in the interior of the flat additive manufacturing assembly component 322. An outlet 653 of the first-section conveying channel 651 and an inlet 656 of the second-section conveying channel 655 are arranged relative to each other in position. When the flat additive manufacturing assembly component 322 is assembled on the thermal conducting pedestal 310, the first-section conveying channel 651 and the second-section conveying channel 655 are communicated with each other. The outlet of the second-section conveying channel 655 is communicated to a releasing aperture 670 of a capillary releasing channel 680, and inlet 652 is communicated with the conveying pipe 620.

The flat additive manufacturing assembly component 322 is provided with two capillary releasing channels 680 on a working surface 325 of an inner wall of a working well 360, and a releasing aperture 670 opened in the middle on the working surface 325. Each capillary releasing channel 680 is communicated with the releasing aperture 670, and a functional liquid 690 flowing out from the releasing aperture 670 is received by using the releasing aperture 670 as an inlet.

An outlet 681 of the capillary releasing channel 680 is located on both sides of the working surface 325, and is approximately close to four corners of the thermal conducting pedestal 310. The height of the outlet 681 is lower than that of the releasing aperture 670, therefore the capillary releasing channel 680 has a certain slope. The geometric structure of the capillary releasing channel 680 is preferably a narrow and long open channel with a depth and width less than 0.2 mm, so the functional liquid 690 flowing into the capillary releasing channel 680 is mainly driven by capillary action and gravity, and is released from the releasing aperture 670 to the outlet 681, and then discharged into a gap G between the flat additive manufacturing assembly component 322 and a manufacturing platform 340.

The capillary releasing channels 680 are configured on each flat additive manufacturing assembly component 321, 322, 323 and 324, i.e., four inner walls of the working well 360 are provided with the capillary releasing channels 680. The structures described above are arranged on each flat additive manufacturing assembly component 321, 322, 323 and 324, but the flat additive manufacturing assembly component 322 is used as an example for illustration above.

Figure 14:
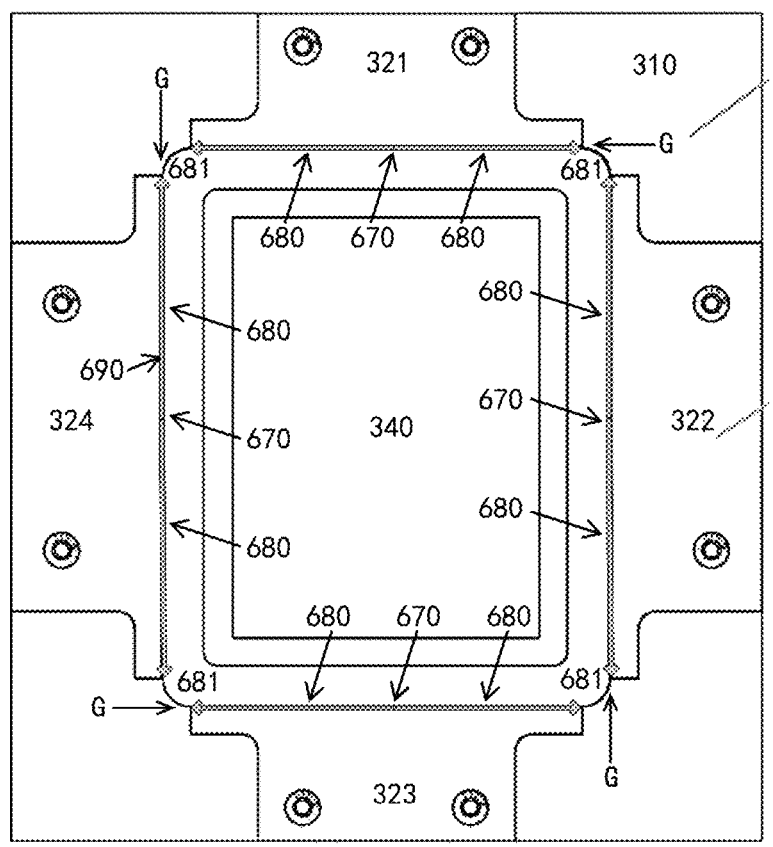
FIG. 14 is a top-view schematic diagram illustrating the operation of a capillary based functional liquid releasing module according to the present invention.

FIG. 14 is a top-view schematic diagram illustrating the operation of a capillary based functional liquid releasing module according to the present invention. When a capillary functional liquid releasing module according to the present invention is operated on a three-dimensional additive manufacturing machine, the controller 640 starts the operation of the peristaltic pump 610 to extract the functional liquid 690 from the functional liquid reservoir 630, and pump it through the conveying pipe 620 to the inlet 652 of the first-section conveying channel 651 of the thermal conducting pedestal 310. Then it is conveyed through the first-section conveying channel 651 inside the thermal conducting pedestal 310, then into the second-section conveying channel 655 inside the flat additive manufacturing assembly components 321, 322, 323 and 324, and reaches the releasing aperture 670.

The functional liquid 690 is released from the releasing aperture 670 into the capillary releasing channel 680. The functional liquid 690 is finally flowed out from the outlet 681 to four corners of the working well 360, and finally flowed into a tiny gap G between the flat additive manufacturing assembly components 321, 322, 323 and 324 and the manufacturing platform 340. Since the gap G is a very small slit, the spacing is usually less than 1 mm, the flow of the functional liquid 690 flowing into the gap G is dominated by capillary force, and is diffused around the entire gap G indiscriminately by capillary action, and finally filled in most parts of the gap G.

The functional liquid 690 is preferably an antifreeze, such as a high-purity ethanol solution with a freezing point of −114° C. After injecting into the gap G, when the operating temperature is lower than 0° C., it can prevent the water vapor from staying in the gap G and form frost or ice, and dissolve the nearby frost. The ethanol dehydrates the bacterial cells and has an effect of disinfection and sterilization. Also, the functional liquid 690 is preferably a heat transfer liquid, such as lubricating liquid or a friction oil. When the operating temperature is higher than 0° C., after filling the gap G, the heat conducting efficiency is straightforwardly improved. The energy of the thermal conducting pedestal 310 is efficiently transferred to the manufacturing platform 340. It is provided as use as the heat transfer medium for the manufacturing machine at room or higher temperature.

The added amount of the functional liquid 690 should not be excessive to avoid affecting the manufacturing quality. Preferably, the peristaltic pump 610 can pump a flow at the rate of 0.5 ml per minute. Through the associated control of the controller 640, the accuracy of the peristaltic pump 610 can reach ±1%. When the functional liquid 690 is a high-purity ethanol solution, since ethanol is a volatile solution with a fast volatilization rate, it needs to be re-injected periodically, such as but not limited to, 15 minutes, to avoid the occurrence of frost again during low-temperature manufacturing. It ensures that the manufacturing platform 340 and the working well 360 are not stuck together due to frost to cause a collision, and are able to move up and down normally. After the functional liquid 690 is injected into the gap G, the efficiency of the low temperature conducted from the working well 360 to the manufacturing platform 340 is also increased.

Figure 15A:
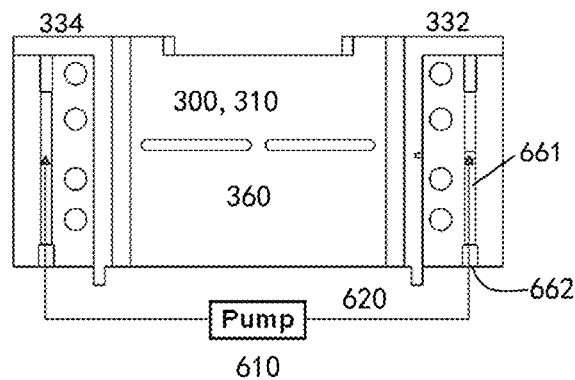
FIG. 15(a) is a cross-sectional exploded-view schematic diagram illustrating a conveying channel included in the capillary based functional liquid releasing module arranged on a rotary additive manufacturing machine.
Figure 15B:
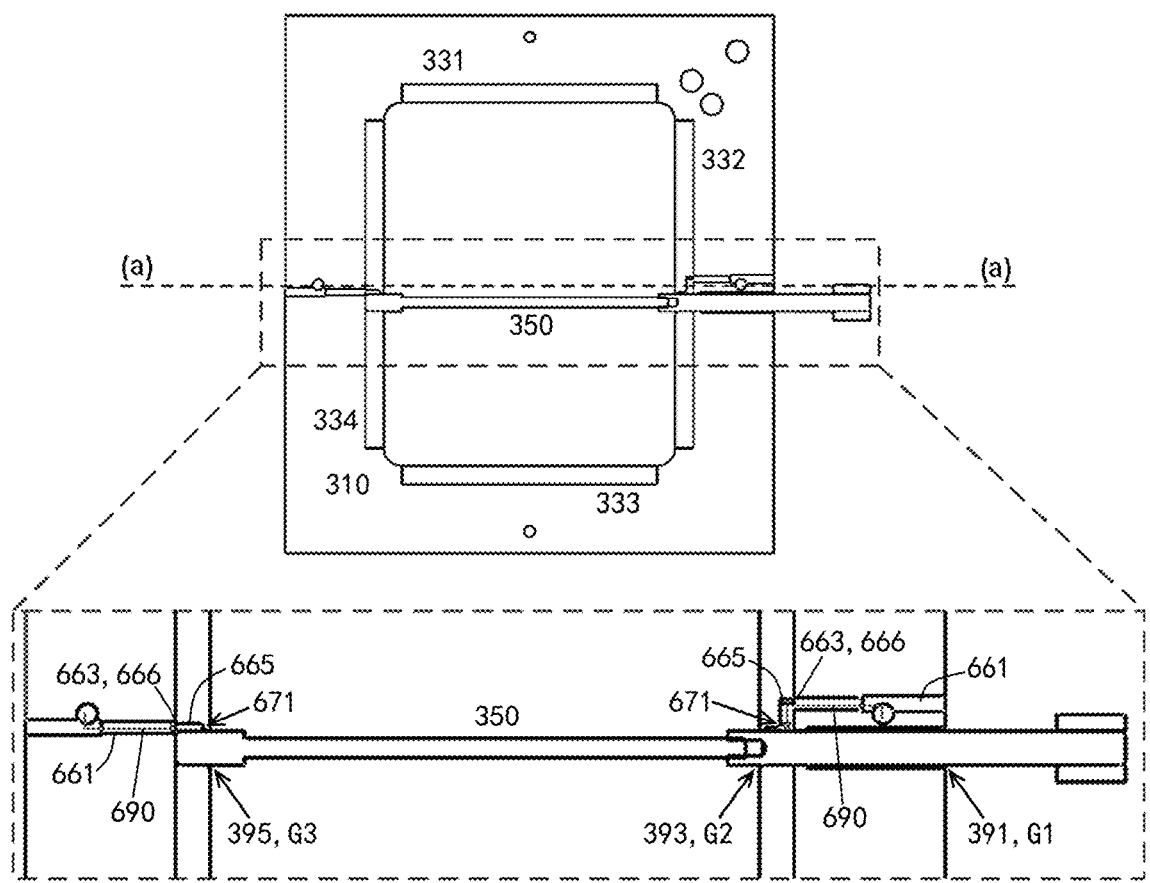
FIG. 15(b) is a cross-sectional structural schematic diagram illustrating a conveying channel included in the capillary based functional liquid releasing module arranged on a rotary additive manufacturing machine.

FIG. 15(a) is a cross-sectional exploded-view schematic diagram illustrating a conveying channel included in the capillary based functional liquid releasing module arranged on a rotary additive manufacturing machine. FIG. 15(b) is a cross-sectional structural schematic diagram illustrating a conveying channel included in the capillary based functional liquid releasing module arranged on a rotary additive manufacturing machine. On the rotary additive manufacturing machine 20, a first-section conveying channel 661 is preferably shared with the first-section conveying channel 651 of the three-dimensional additive manufacturing machine 10, or is separately provided. The first-section conveying channel 661 is arranged inside the thermal conducting pedestal 310, and the inlet 662 of the first-section conveying channel 661 is disposed at the bottom of the thermal conducting pedestal 310.

The second-section conveying channel 665 is configured in the interior of the curve additive manufacturing assembly components 332 and 334. An outlet 663 of the first-section conveying channel 661 and an inlet 666 of the second-section conveying channel 665 are arranged relative to each other in position. After the curve additive manufacturing assembly components 332 and 334 are assembled on the thermal conducting pedestal 310, the first-section conveying channel 661 and the second-section conveying channel 665 are communicated with each other. An outlet of the conveying channel 665 is a releasing aperture 671, and the inlet 662 is communicated with the conveying pipe 620.

On the rotary additive manufacturing machine 20, the releasing aperture 671 is configured to be directly communicated with a second bearing bore 393 and a third bearing bore 395, that is, the releasing aperture 671 can directly inject the functional liquid 690 into a second gap G2 and a third gap G3 included between the second bearing bore 393, the third bearing bore 395 and a manufacturing spindle 350. The functional liquid 690 flowed into the second gap G2 and the third gap G3 spreads around the entire second gap G2 and the third gap G3 indiscriminately under the capillary force, and is finally filled most parts of the second gap G2 and the third gap G3. It avoids the frost formation of the manufacturing spindle 350, or the heat conduction efficiency of the manufacturing spindle 350 is improved. The functional liquid 690 flowed into the second bearing bore 393 also flows into the first gap G1 included between a first bearing bore 391 and the manufacturing spindle 350 under the traction of capillary force.

When the capillary based functional liquid releasing module according to the present invention is operated on the three-dimensional additive manufacturing machine, the flow path of the functional liquid 690 starts from the functional liquid reservoir 630. It is driven by the peristaltic pump 610 through the conveying pipe 620, pumped to the first-section conveying channel 661 inside the thermal conducting pedestal 310, and then enters the second-section conveying channel 665 inside the curve additive manufacturing assembly components 332 and 334 to arrive the releasing aperture 671. Then it is flowed into the first bearing bore 391, the second bearing bore 393 and the third bearing bore 395 to be injected into the first gap G1, the second gap G2 and the third gap G3.

Figure 16A:
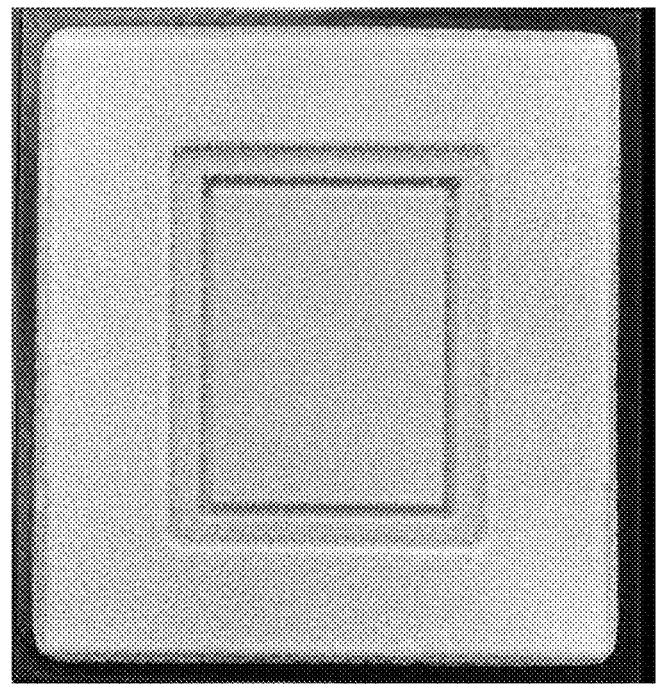
FIG. 16(a) is a photograph showing the frost formed during the low-temperature manufacturing process performed by the three-dimensional additive manufacturing machine covered on the manufacturing platform according to the present invention.
Figure 16B:
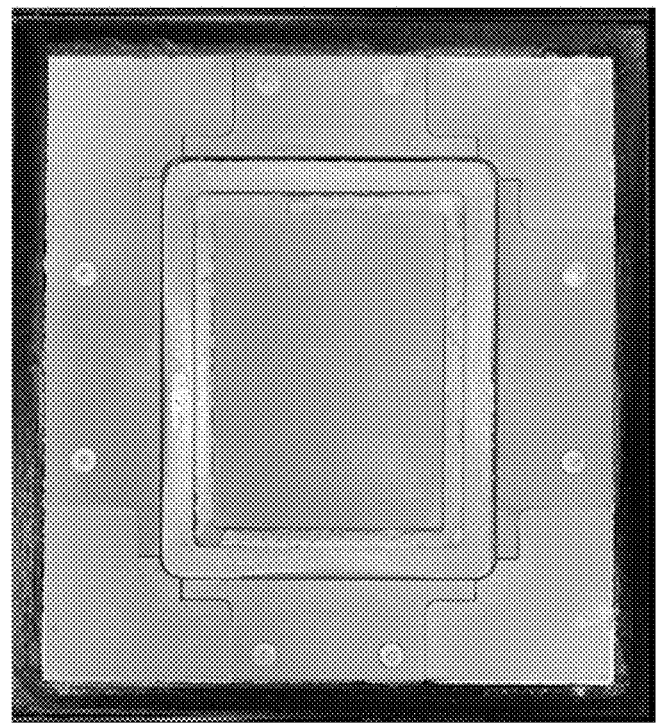
FIG. 16(b) is a photograph showing the removal of the frost formed during the low-temperature manufacturing process covered on the manufacturing platform by a capillary functional liquid releasing module that is configured on a three-dimensional additive manufacturing machine according to the present invention.

FIG. 16(a) is a photograph showing the frost formed during the low-temperature manufacturing process performed by the three-dimensional additive manufacturing machine covered on the manufacturing platform according to the present invention. FIG. 16(b) is a photograph showing the removal of the frost formed during the low-temperature manufacturing process covered on the manufacturing platform by a capillary functional liquid releasing module that is configured on a three-dimensional additive manufacturing machine according to the present invention. As shown in FIG. 16(a), it is viewable that during the low temperature manufacturing process of the three-dimensional additive manufacturing machine, the manufacturing platform often encounters frost formation, which causes the machine to collide or freeze.

FIG. 16(b) shows the effect of the capillary based functional liquid releasing module according to the present invention releasing antifreeze to the corners and the gaps around the manufacturing platform through the releasing aperture at a operating temperature of −20° C. To increasing the visualized effect, the case shown in FIG. 16(b) injects more antifreeze into the gap, therefore it clearly shows the phenomenon that the antifreeze overflows from the gap on the four sides of the manufacturing platform, and the frost near the gap is also clearly melt.

As shown in FIG. 16(b), it is found that at a low temperature of −20° C., a thin layer of frost has formed on the manufacturing platform, the flat additive manufacturing assembly components and the thermal conducting pedestal, but the corners and gaps around the manufacturing platform are almost filled with antifreeze, and there is no icing and frosting phenomenon.

The exchangeable additive manufacturing machine system according to the present invention is built up into at least two different configurations by simply replacing flat additive manufacturing assembly components 321, 322, 323 and 324, and curve additive manufacturing assembly components 331, 332, 333 and 334 on the thermal conducting pedestal 310 to be switched between the different configurations of the three-dimensional additive manufacturing machine 10 and the rotary additive manufacturing machine 20, without changing the three-dimensional motion mechanism 100, the additive manufacturing module 200 and the capillary based functional liquid releasing module 600.

The exchangeable additive manufacturing machine system with a capillary based functional liquid releasing module according to the present invention further includes at least the following features: (1) the layer-by-layer additive manufacturing is performed by the manufacturing platform that is lifted and lowered in the Z-axis direction to reduce the movement of the gantry multi-axis motion platform in the Z-axis direction; (2) it is switched between the three-dimensional additive manufacturing machine and the rotary additive manufacturing machine by simply replacing different assembly components, without changing most main components; and (3) it is equipped with a capillary based functional liquid releasing module to eliminate machine frost and increase machine energy transfer efficiency, and it is applicable for both high and low temperature operations.

There are further embodiments provided as follows.

Embodiment 1: An exchangeable additive manufacturing machine system includes: a thermal conducting module; a manufacturing platform and a plurality of flat additive manufacturing assembly components, wherein the plurality of flat additive manufacturing assembly components are selectively attached to a center portion of the thermal conducting module to form a working well, the manufacturing platform is selectively configured in the working well and moves along the working well and the manufacturing platform and the working well define a manufacturing region; a manufacturing spindle and a plurality of curve additive manufacturing assembly components, wherein the plurality of curve additive manufacturing assembly components are selectively attached to the center portion of the thermal conducting module to form the working well, the manufacturing spindle is selectively configured to rotate in the working well and the manufacturing spindle and the working well define the manufacturing region; and a capillary based functional liquid releasing module, configured to attach on at least the thermal conducting module to release a functional liquid into a gap included between the thermal conducting module and the manufacturing platform or one of a first gap, a second gap and a third gap included between the thermal conducting module and the manufacturing spindle, wherein the exchangeable additive manufacturing machine system is formed as a three-dimensional additive manufacturing machine by selectively configuring with the manufacturing platform and the plurality of flat additive manufacturing assembly components or a rotary additive manufacturing machine by selectively configuring with the manufacturing spindle and the plurality of curve additive manufacturing assembly components.

Embodiment 2: The exchangeable additive manufacturing machine system as described in Embodiment 1 further includes one of: a flat additive manufacturing positioning component; and the plurality of flat additive manufacturing assembly components being attached to the thermal conducting module through guidance of the flat additive manufacturing positioning component, to configure in the center portion to form an inner wall of the working well, so to render the exchangeable additive manufacturing machine system to be formed as the three-dimensional additive manufacturing machine, wherein the gap is included between a first flat additive manufacturing assembly component selected from one of the plurality of flat additive manufacturing assembly components and the manufacturing platform.

Embodiment 3: The exchangeable additive manufacturing machine system as described in Embodiment 2, the capillary based functional liquid releasing module further includes one of: a functional liquid reservoir for reserving a functional liquid; a conveying pipe communicating with the functional liquid reservoir and serving as a part of a conveying path for the functional liquid; at least one conveying channel configured inside the first flat additive manufacturing assembly component and serving as another part of the conveying path; a releasing aperture opened on the first flat additive manufacturing assembly component and communicating with the at least one conveying channel; a capillary releasing channel including an inlet and an outlet, configured on the first flat additive manufacturing assembly component, and having a slope and a width less than 1 mm to drive the functional liquid flowing by a gravity or a capillary force, wherein the outlet is positioned and oriented toward the gap; a peristaltic pump pumping the functional liquid out of from the reservoir and conveying it to the releasing aperture through the conveying pipe so as to convey the functional liquid to arrive the capillary releasing channel, wherein the functional liquid is driven to the outlet by the gravity or the capillary force, flows into the gap and diffuses in the gap with no difference due to the driving of the capillary force; and a controller controlling the peristaltic pump to activate periodically or non-periodically to drive the functional liquid flowing to the releasing aperture.

Embodiment 4: The exchangeable additive manufacturing machine system as described in Embodiment 1, the thermal conducting module further includes one of: a curve additive manufacturing positioning component and a first bearing bore, wherein the first bearing bore provides for the manufacturing spindle to pass through to enter into the working well, wherein the first gap is included between the first bearing bore and the manufacturing spindle; and the plurality of curve additive manufacturing assembly components being attached to the thermal conducting module through guidance of the curve additive manufacturing positioning component, to configure in the center portion to form an inner wall of the working well, so to render the exchangeable additive manufacturing machine system to be formed as the rotary additive manufacturing machine, wherein a first curve additive manufacturing assembly component selected from one of the plurality of curve additive manufacturing assembly components further includes a second bearing bore to provide for the manufacturing spindle to pass through to enter into the working well, and the second gap is included between the second bearing bore and the manufacturing spindle, wherein a second curve additive manufacturing assembly component selected from one of the plurality of curve additive manufacturing assembly components further includes a third bearing bore to contain a part of the manufacturing spindle, and the third gap is included between the second third bore and the manufacturing spindle.

Embodiment 5: The exchangeable additive manufacturing machine system as described in Embodiment 4, the capillary based functional liquid releasing module further includes one of: a functional liquid reservoir for reserving a functional liquid; a conveying pipe communicating with the functional liquid reservoir and serving as a part of a conveying path for the functional liquid; at least one conveying channel configured inside the first curve additive manufacturing assembly component and serving as another part of the conveying path; a releasing aperture opened on the first curve additive manufacturing assembly component and communicating with the at least one conveying channel, wherein the releasing aperture is positioned and oriented toward one of the first gap, the second gap and the third gap; a peristaltic pump pumping the functional liquid out of from the reservoir and conveying it to the releasing aperture through the conveying pipe so as to convey the functional liquid to arrive the capillary releasing channel, wherein the functional liquid is driven to the outlet by the gravity or the capillary force, flows into the gap and diffuses in the gap with no difference due to the driving of the capillary force; and a controller controlling the peristaltic pump to activate periodically or non-periodically to drive the functional liquid flowing to the releasing aperture.

Embodiment 6: The exchangeable additive manufacturing machine system as described in Embodiment 1 further includes one of: the thermal conducting module further including a medium channel inside providing for a heat transfer medium flowing therein, wherein the medium channel has an entrance configured at a bottom side of the thermal conducting module; a three-dimensional motion mechanism including a gantry multi-axis motion platform to carry a nozzle and drive the nozzle to move along an X-axis track, a Y-axis track and a Z-axis track to move toward an X-axis direction, a Y-axis direction and a Z-axis direction respectively; the nozzle being positioned on the manufacturing region by the three-dimensional motion mechanism; a circulated cooling unit configured to actively cool down the heat transfer medium; a circulated heating unit configured to actively heat up the heat transfer medium; a circulating pipe communicating between the circulated cooling unit and the thermal conducting module or communicating between the circulated heating unit and the thermal conducting module, and providing for the heat transfer medium flowing therein; a manufacturing platform controlling module including a linear motor to drive the manufacturing platform moving along the working well; and a spindle controlling module including a step motor to drive the manufacturing spindle to rotate.

Embodiment 7: The exchangeable additive manufacturing machine system as described in Embodiment 6, the heat transfer medium is a coolant liquid, a circulating fluid or an Ethanol and the functional liquid is an antifreeze, a defrosting liquid, a heat transfer liquid, a lubricating liquid or a friction oil.

Embodiment 8: An exchangeable additive manufacturing machine system includes: a manufacturing platform; a thermal conducting module configured to include a working well in a center portion, wherein the manufacturing platform is configured in the working well and moves along the working well and the manufacturing platform and the working well defines a manufacturing region; and a capillary based functional liquid releasing module configured on the thermal conducting module to release a functional liquid to a gap included between the thermal conducting module and the manufacturing platform.

Embodiment 9: An exchangeable additive manufacturing machine system includes: a manufacturing spindle; a thermal conducting module configured to include a working well in a center portion, wherein the manufacturing spindle is configured to rotate in the working well and the manufacturing spindle and the working well defines a manufacturing region; and a capillary based functional liquid releasing module configured on the thermal conducting module to release a functional liquid to one of a first gap, a second gap and a third gap included between the thermal conducting module and the manufacturing platform.

While the disclosure has been described in terms of what are presently considered to be the most practical and preferred embodiments, it is to be understood that the disclosure need not be limited to the disclosed embodiments. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present disclosure which is defined by the appended claims.

What is claimed is:

1. An exchangeable additive manufacturing machine system, comprising:
    a thermal conducting module;
    a manufacturing platform and a plurality of flat additive manufacturing assembly components, wherein the plurality of flat additive manufacturing assembly components are selectively attached to a center portion of the thermal conducting module to form a working well, the manufacturing platform is selectively configured in the working well and moves along the working well and the manufacturing platform and the working well define a manufacturing region;
    a manufacturing spindle and a plurality of curve additive manufacturing assembly components, wherein the plurality of curve additive manufacturing assembly components are selectively attached to the center portion of the thermal conducting module to form the working well, the manufacturing spindle is selectively configured to rotate in the working well and the manufacturing spindle and the working well define the manufacturing region; and
    a capillary based functional liquid releasing module, configured to attach on at least the thermal conducting module to release a functional liquid into a gap comprised between the thermal conducting module and the manufacturing platform or one of a first gap, a second gap and a third gap comprised between the thermal conducting module and the manufacturing spindle,
    wherein the exchangeable additive manufacturing machine system is formed as a three-dimensional additive manufacturing machine by selectively configuring with the manufacturing platform and the plurality of flat additive manufacturing assembly components or a rotary additive manufacturing machine by selectively configuring with the manufacturing spindle and the plurality of curve additive manufacturing assembly components.

2. The exchangeable additive manufacturing machine system as claimed in claim 1, further comprising one of:
    a flat additive manufacturing positioning component; and
    the plurality of flat additive manufacturing assembly components being attached to the thermal conducting module through guidance of the flat additive manufacturing positioning component, to configure in the center portion to form an inner wall of the working well, so to render the exchangeable additive manufacturing machine system to be formed as the three-dimensional additive manufacturing machine,
    wherein the gap is included between a first flat additive manufacturing assembly component selected from one of the plurality of flat additive manufacturing assembly components and the manufacturing platform.

3. The exchangeable additive manufacturing machine system as claimed in claim 2, wherein the capillary based functional liquid releasing module further comprises one of:
    a functional liquid reservoir for reserving a functional liquid;
    a conveying pipe communicating with the functional liquid reservoir and serving as a part of a conveying path for the functional liquid;
    at least one conveying channel configured inside the first flat additive manufacturing assembly component and serving as another part of the conveying path;
    a releasing aperture opened on the first flat additive manufacturing assembly component and communicating with the at least one conveying channel;

a capillary releasing channel comprising an inlet and an outlet, configured on the first flat additive manufacturing assembly component, and having a slope and a width less than 1 mm to drive the functional liquid flowing by a gravity or a capillary force, wherein the outlet is positioned and oriented toward the gap;

a peristaltic pump pumping the functional liquid out of from the reservoir and conveying it to the releasing aperture through the conveying pipe so as to convey the functional liquid to arrive the capillary releasing channel, wherein the functional liquid is driven to the outlet by the gravity or the capillary force, flows into the gap and diffuses in the gap with no difference due to the driving of the capillary force; and a controller controlling the peristaltic pump to activate periodically or non-periodically to drive the functional liquid flowing to the releasing aperture.

4. The exchangeable additive manufacturing machine system as claimed in claim 1, wherein the thermal conducting module further comprises one of:

a curve additive manufacturing positioning component and a first bearing bore, wherein the first bearing bore provides for the manufacturing spindle to pass through to enter into the working well, wherein the first gap is included between the first bearing bore and the manufacturing spindle; and the plurality of curve additive manufacturing assembly components being attached to the thermal conducting module through guidance of the curve additive manufacturing positioning component, to configure in the center portion to form an inner wall of the working well, so to render the exchangeable additive manufacturing machine system to be formed as the rotary additive manufacturing machine, wherein a first curve additive manufacturing assembly component selected from one of the plurality of curve additive manufacturing assembly components further comprises a second bearing bore to provide for the manufacturing spindle to pass through to enter into the working well, and the second gap is included between the second bearing bore and the manufacturing spindle, wherein a second curve additive manufacturing assembly component selected from one of the plurality of curve additive manufacturing assembly components further comprises a third bearing bore to contain a part of the manufacturing spindle, and the third gap is included between the second third bore and the manufacturing spindle.

5. The exchangeable additive manufacturing machine system as claimed in claim 4, wherein the capillary based functional liquid releasing module further comprises one of:

a functional liquid reservoir for reserving a functional liquid;

a conveying pipe communicating with the functional liquid reservoir and serving as a part of a conveying path for the functional liquid;

at least one conveying channel configured inside the first curve additive manufacturing assembly component and serving as another part of the conveying path;

a releasing aperture opened on the first curve additive manufacturing assembly component and communicating with the at least one conveying channel, wherein the releasing aperture is positioned and oriented toward one of the first gap, the second gap and the third gap;

a peristaltic pump pumping the functional liquid out of from the reservoir and conveying it to the releasing aperture through the conveying pipe so as to convey the functional liquid to arrive the capillary releasing channel, wherein the functional liquid is driven to the outlet by the gravity or the capillary force, flows into the gap and diffuses in the gap with no difference due to the driving of the capillary force; and a controller controlling the peristaltic pump to activate periodically or non-periodically to drive the functional liquid flowing to the releasing aperture.

6. The exchangeable additive manufacturing machine system as claimed in claim 1, wherein the functional liquid is an antifreeze, a defrosting liquid, a heat transfer liquid, a lubricating liquid or a friction oil.

7. An exchangeable additive manufacturing machine system, comprising:

a manufacturing platform;

a thermal conducting module configured to include a working well in a center portion, wherein the manufacturing platform is configured in the working well and moves along the working well and the manufacturing platform and the working well defines a manufacturing region; and a capillary based functional liquid releasing module configured on the thermal conducting module to release a functional liquid to a gap comprised between the thermal conducting module and the manufacturing platform.

8. An exchangeable additive manufacturing machine system, comprising:

a manufacturing spindle;

a thermal conducting module configured to include a working well in a center portion, wherein the manufacturing spindle is configured to rotate in the working well and the manufacturing spindle and the working well defines a manufacturing region; and a capillary based functional liquid releasing module configured on the thermal conducting module to release a functional liquid to one of a first gap, a second gap and a third gap comprised between the thermal conducting module and the manufacturing platform.

* * * * *